Dec. 28, 1926.

I. A. WEAVER 1,612,405

GYROSCOPIC DEVICE

Filed Sept. 10, 1921      7 Sheets-Sheet 1

Witness:
A. J. Sauser

Inventor:
Ira A. Weaver
By Walter M. Fuller
Atty.

Dec. 28, 1926.

I. A. WEAVER 1,612,405

GYROSCOPIC DEVICE

Filed Sept. 10, 1921          7 Sheets-Sheet 4

Witness:
A. J. Sauser.

Inventor:
Ira A. Weaver
By Walter M. Fuller
Atty.

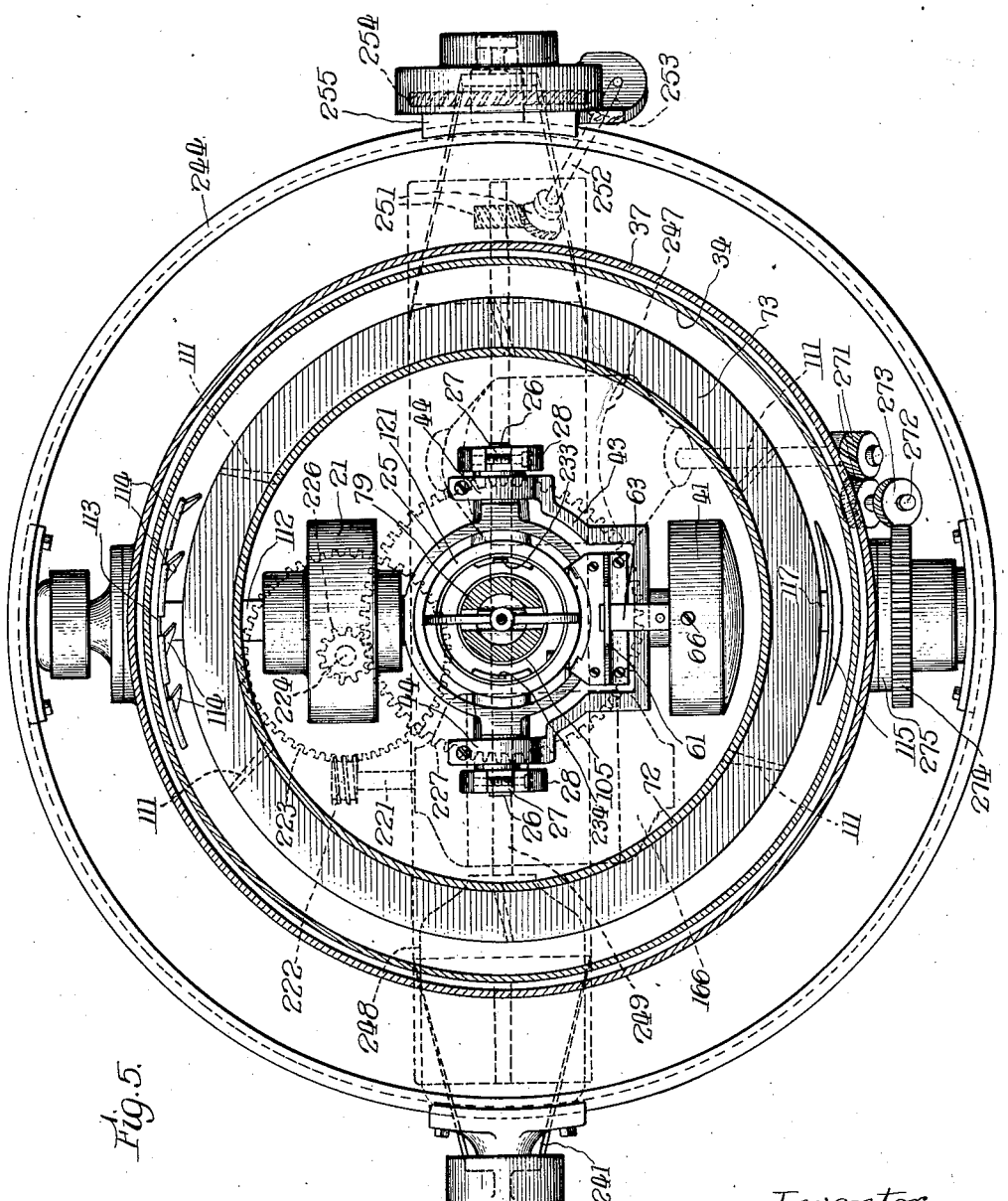

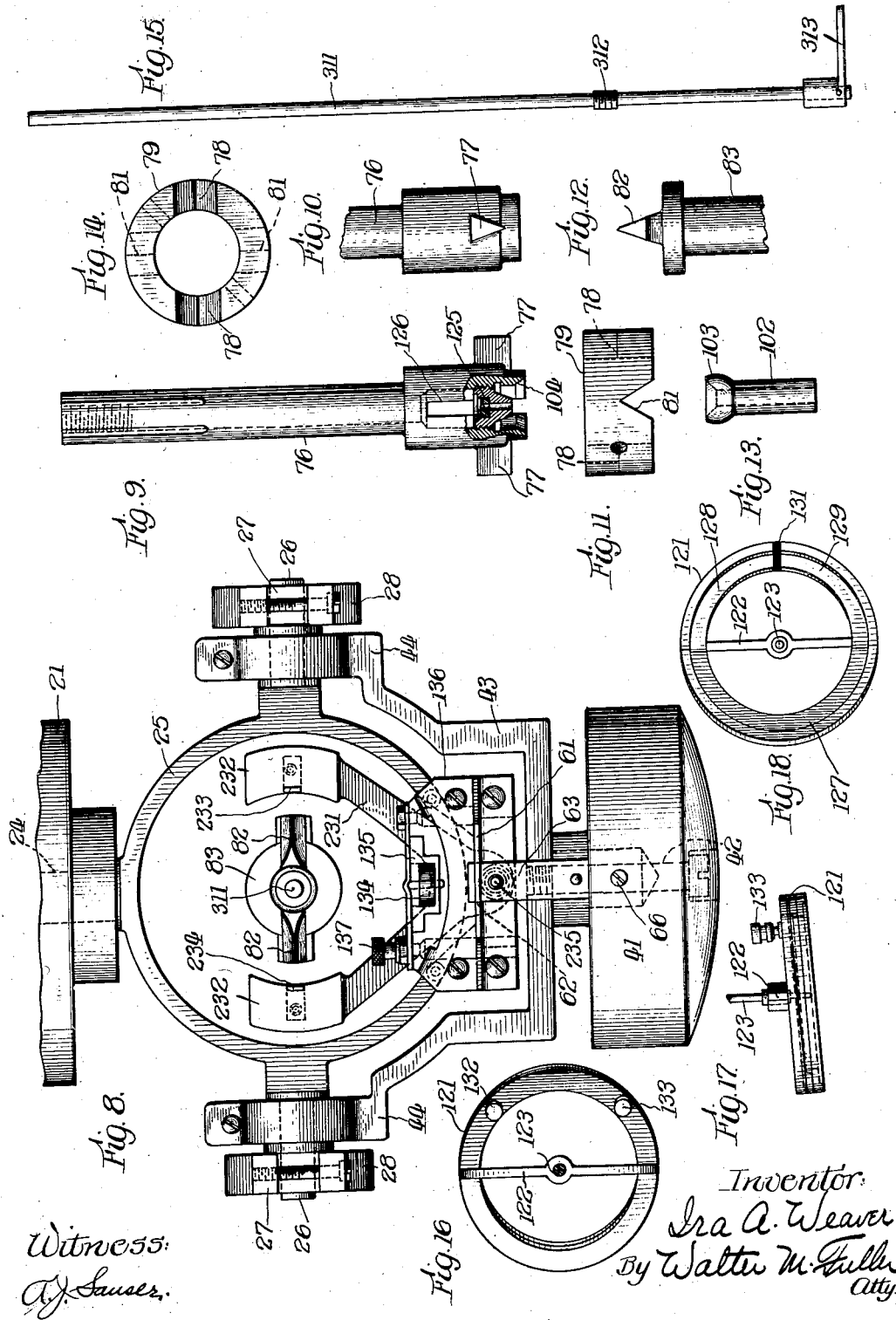

Dec. 28, 1926.  
I. A. WEAVER  
1,612,405  
GYROSCOPIC DEVICE  
Filed Sept. 10, 1921  7 Sheets-Sheet 7
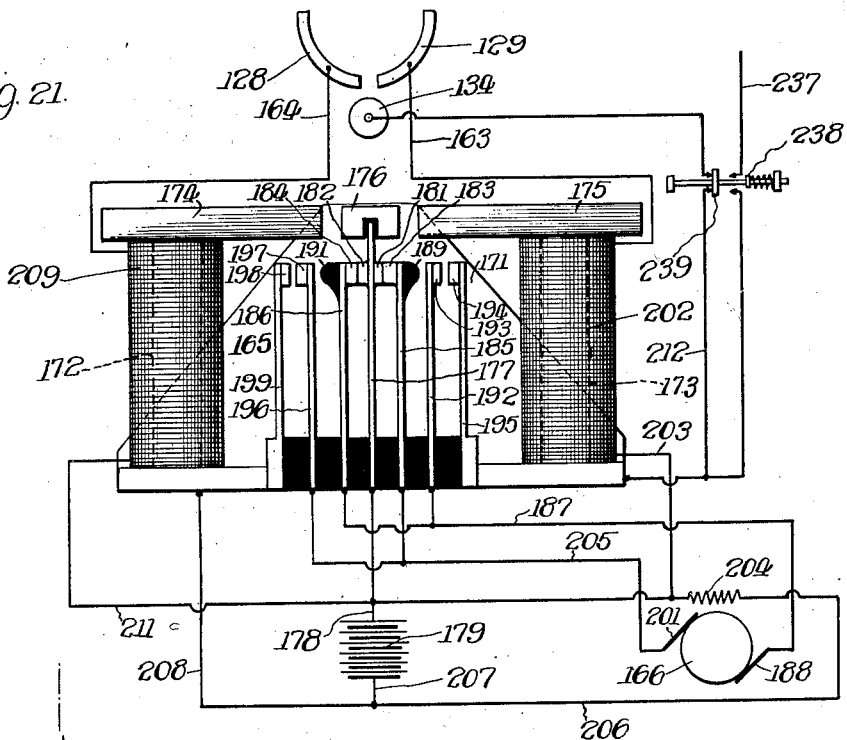
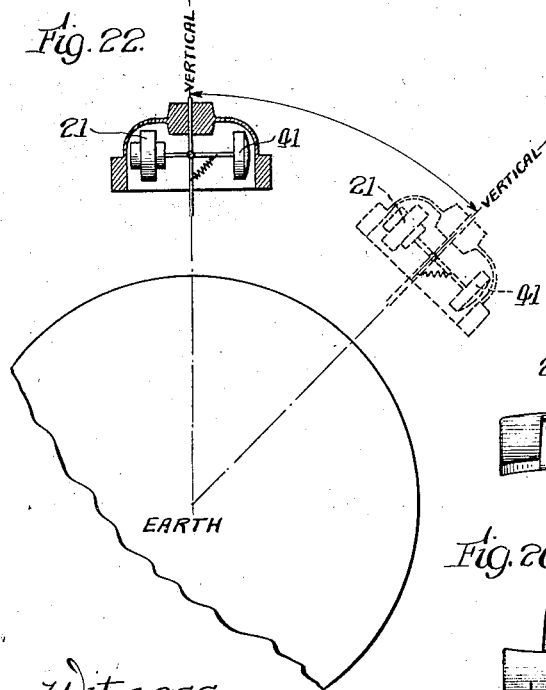
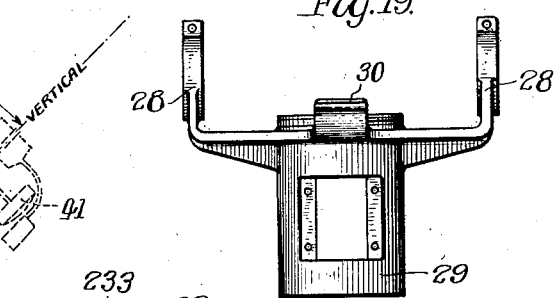
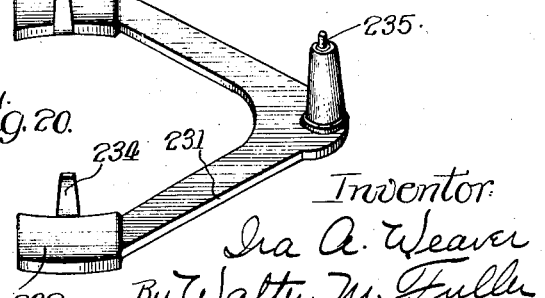

Patented Dec. 28, 1926.

1,612,405

UNITED STATES PATENT OFFICE.

IRA A. WEAVER, OF SPRINGFIELD, ILLINOIS.

GYROSCOPIC DEVICE.

Application filed September 10, 1921. Serial No. 499,774.

My invention pertains to the provision of a suitable instrument for use especially, but not restrictedly, on airplanes, ship-masts, balloons, and other unstable bodies to indicate the speed of travel of the instrument over the face of the earth, to permit the ascertainment of the total distance traveled, to enable the operator to determine his exact position over the earth, to indicate the true meridian and act as a compass, to ascertain side drift of the appliance on which the instrument is mounted, to find the inclination of the instrument, to establish the proper time for dropping bombs to hit desired objects, for use in range finding and making celestial observations, and for many other similar purposes.

To this end, the appliance embodying the invention employs the peculiar and characteristic functioning properties of gyroscopes combined with the known action of gravity and inertia.

Heretofore, most of the attempts to accomplish these results by gyroscopic force and gravity employed only one gyroscope, and the failure of a device of this type lies in the fact that a neutrally-mounted gyroscope with a freedom of movement in all directions, having its center of gravity at the center of its support, so that it is not affected by inertia nor gravity, is subject to two forces, first the rotation of the earth and second the friction of the bearings of the instrument in which it is mounted. A gyroscope so mounted, and assuming there were no friction in its supporting bearings, would be subject to a continuous wandering when once its axis were removed from a position parallel with that of the earth's axis, and in order to control the movement of such a gyroscope gravity has been employed, by mounting the gyroscope so that its center of mass will be below its supporting mounting, or by adding weight to the gyroscope frame. One objection to an appliance of this kind is that since gravity acts in a vertical line to the center of the earth, when a weight or mass is attached to a point of support, gravity or the directive force of the weight has reached the zero point and has substantially no power to maintain the position of the weight when it is hanging vertically, its maximum force being exerted when the weight is at right angles to its support.

Another characteristic of an unbalanced weight acted upon by gravity is that it is subject to inertia and, therefore, a single gyroscope controlled by gravity when subject to inertia is also subject to a precessional movement caused by the pendulosity of the unbalanced mounting.

As contrasted with these constructions I have provided means for establishing a substantially absolutely vertical line by allowing the force of gravity to act at its maximum by placing the weight at right angles from its support, causing it to act on a gyroscope producing a horizontal precessional rotation, and I have succeeded in counteracting the inertia of such weight by a weight of equal magnitude on the opposite side of the vertical line and rotating with the weight, the two weights balancing each other against inertia but allowing the one controlling the gyroscope to be acted upon freely by gravity.

It will therefore be seen that inertia in a horizontal plane, that would have a tendency during a change of speed to tilt the gyroscope out of its horizontal plane, is entirely overcome.

Inertia, however, caused by a change in elevation or the descent of the instrument, would cause the weight suspended at right angles from its support to rise or descend, increasing or decreasing the speed of the precessional movement of the gyroscope and its mounting.

In order that this inertia may be counterbalanced, without modifying the action of gravity on the body, and so that it is not affected by inertia in any direction, the inertia counterbalancing weight referred to carried by the precessional gyroscope is mounted to raise and lower and is spring balanced against gravity and is connected to the unbalanced gyroscope mounting, preferably by a slotted connection, so that the inertia acting in a vertical direction on the one side will exactly balance the inertia on the other side without affecting the action of gravity on such other side.

A gyroscope mounted on a horizontal axis, one end of which rests on a support, with the other or outer end free to rise and descend, will, when spun at a constant speed, on its own axis, and unless acted upon by outside forces, precess or revolve around the support in a horizontal plane due to the action of gravity thereon, and the direction of such precessional rotation will depend upon the direction of rotation of the gyroscope wheel about its own axis, such precession being in the direction of rotation of the lower side of the spinning gyroscope element.

If a weight were added to the outer end of such axle, thereby increasing the effect of gravity, the precession would be hastened, and, on the other hand, if the weight were reduced in amount or removed, thus lessening the action of gravity on the appliance, the rate of precession would be less. As the precessional rotation is increased by an outside force, the outer end of the axle will rise above the normal horizontal position, and, on the other hand, if such precession is retarded or restrained, even by a small amount of friction of its bearings, and the electrical contact brushes conveying the current to the motor, the axle will gradually drop below such normal horizontal plane.

It should be clear, therefore, that if the speed of precession is irregular, instead of constant, its plane will be tilted and it is therefore necessary to overcome the friction of the bearings and electrical contact brushes in its precessional movement.

As this may be a variable element, it is necessary that some automatic means be provided, for, if the force be slightly too great, the gyroscope will gradually rise, and, if not sufficient, it will gradually fall below normal horizontal rotation.

If a precessional gyroscope, such as described, were mounted on an unstable body, such as an aeroplane, no means would be present to ascertain whether or not the axis were precessing in a normally horizontal plane, or whether tilted up or down, but, regardless of whether the axle is horizontal or inclined, the gyroscopic wheel would, nevertheless, precess in some horizontal plane either coincident with, or below, or above the normal horizontal plane.

Having established in the new appliance a vertical axis of precession, as described, in order that it may be known and made use of, I have provided a neutrally mounted gyroscope on a vertical axis and supported on a universal bearing, which is substantially frictionless, so that the axle and the gyroscope are free to tilt in all directions.

In the preferred embodiment of the invention described in detail hereinafter the rotor of this neutrally mounted gyroscope is of inverted dish shape, the outer portion of the rotor being sufficiently large to reach beyond and enclose the precessional gyroscope and its mounting and below the center of such mounting, so that the center of mass of the rotor and its motor driving mechanism coincide with the center of the mounting of the precessional gyroscope, such construction making a compact instrument, but the two gyroscopes need not be associated in this manner as they may be separated with controlling means connecting the two.

As this neutrally mounted gyroscope rotates in a horizontal plane or parallel with the earth's surface, it is apparent that when over the equator, the force required to keep it horizontal would be at its maximum, due to the rotation of the earth, and, when over either pole, its axis of rotation being in line with the earth's axis, the effect of the earth's rotation on the gyroscope would have reached a zero point.

From the above, it will be seen that, if the spin of the gyroscope and its mass is known, the force to keep it moving with the earth or horizontally, could be mathematically determined at any point between the equator and the poles, which would form a means of indicating any latitude.

As the earth rotates one degree in every four minutes from west to east, if the instrument should be carried eastward, the angular momentum would be increased on the gyroscope, and, if carried westwardly, it would be diminished, the change in force being directly proportional to the increased angular movement, and, if a change of latitude takes place its resistance would be increased or diminished.

This movement, or tendency for movement if the actual movement is restrained, combined with time, would form a means of indicating the rate of speed, and as means are provided to indicate the extent of the tip of the gyroscope in relation to the vertical line established, a base line is formed from which inclinations may be determined when in space.

In the desirable embodiment of the invention presented in detail hereinafter, gravity acting to maximum advantage on a horizontally outstanding weight causes a substantially-horizontal precession of a gyroscope, the weight being incorporated in the gyroscope itself in large measure in this particular instance, and such weight is counterbalanced as to inertia with respect to its support by an auxiliary weight, uninfluenced by gravity because the weight is just supported by a very flexible, adjustable, coil spring. The precession of this gyroscope establishes a horizontal plane under all conditions, or, in other words it fixes a vertical line regardless of where the instrument may be and regardless of whether it is stationary or traveling.

The rotation of the earth has no effect on this gyroscope because its plane of precession is governed by the action of gravity which causes the precession itself, and, since gravity always acts vertically at any point on the earth, this plane of precession will always be horizontal.

The neutrally-supported, tiltable gyroscope is not influenced by gravity because it is balanced as to gravity with reference to its support. Its rotor, therefore, tends to maintain its original plane of rotation, and, since the earth revolves continuously at a uniform speed, the position of the plane of rotation of such rotor with reference to the earth would be changing constantly in a uniform manner if the instrument were stationary, and the extent and direction of such tilting action would depend upon a number of factors if the instrument were traveling.

Such tendency to tilting movement, assuming that the instrument is stationary, is overcome by the precessing gravity-controlled gyroscope, and variations from the regular and usual force exerted by the precessional gyroscope to maintain this normal condition permits the ascertainment of the speed of travel of the instrument when the latter is in motion.

Frequent determinations of speed combined with time permits the operator to calculate the total distance traveled and his exact location at any moment.

Since the rotation of the earth is from west to east and since such turning has a direct influence on the gyroscopic appliance constituting the subject matter of this application, means are provided to permit the instrument to remain true to the meridian and to enable it to perform the function of a compass.

In addition, the appliance has an inertia controlled member which may be brought into action when desired whereby it, in co-operation with other elements of the instrument, permits the establishment of the presence of side drift or deviation from the course steered.

To enable those skilled in this art to have a full and complete understanding of this invention and its structural and functional characteristics, I have illustrated a desirable and preferred embodiment of the same in the accompanying drawings, forming a part of this specification, and throughout the several views of which like reference characters refer to the same parts.

In these drawings:

Figure 5 is a horizontal section on line 5—5 of Figure 1 on a reduced scale;

Figure 6 is a plan view of the indicator at the top of the appliance;

Figure 7 is a substantially horizontal section on line 7—7 of Figure 1 illustrating the speed indicator for the upper one of the two gyroscopic mechanisms;

Figure 8 is a horizontal section on line 8—8 of Figure 1 on an enlarged scale;

Figures 9, 10, 11, 12, 13 and 14 are detail views of the universal-joint mounting for the shaft or axle of the upper neutrally-mounted gyroscope;

Figure 15 shows in elevation the rod used for temporarily separating the knife-edge members of such universal joint;

Figures 16, 17, and 18 are detail views of the control-ring;

Figure 19 is an elevation of the sleeve and bracket arms which support the horizontally precessing gyroscope and its associated parts;

Figure 20 is a perspective view of the inertia yoke member used to determine drift;

Figure 21 is a view of one of the electrical controllers and its electric circuits; and Figure 22 is a diagram illustrating the earth and the relation of the gyroscopic elements of the instrument thereto in two different positions of the appliance.

Figure 2:
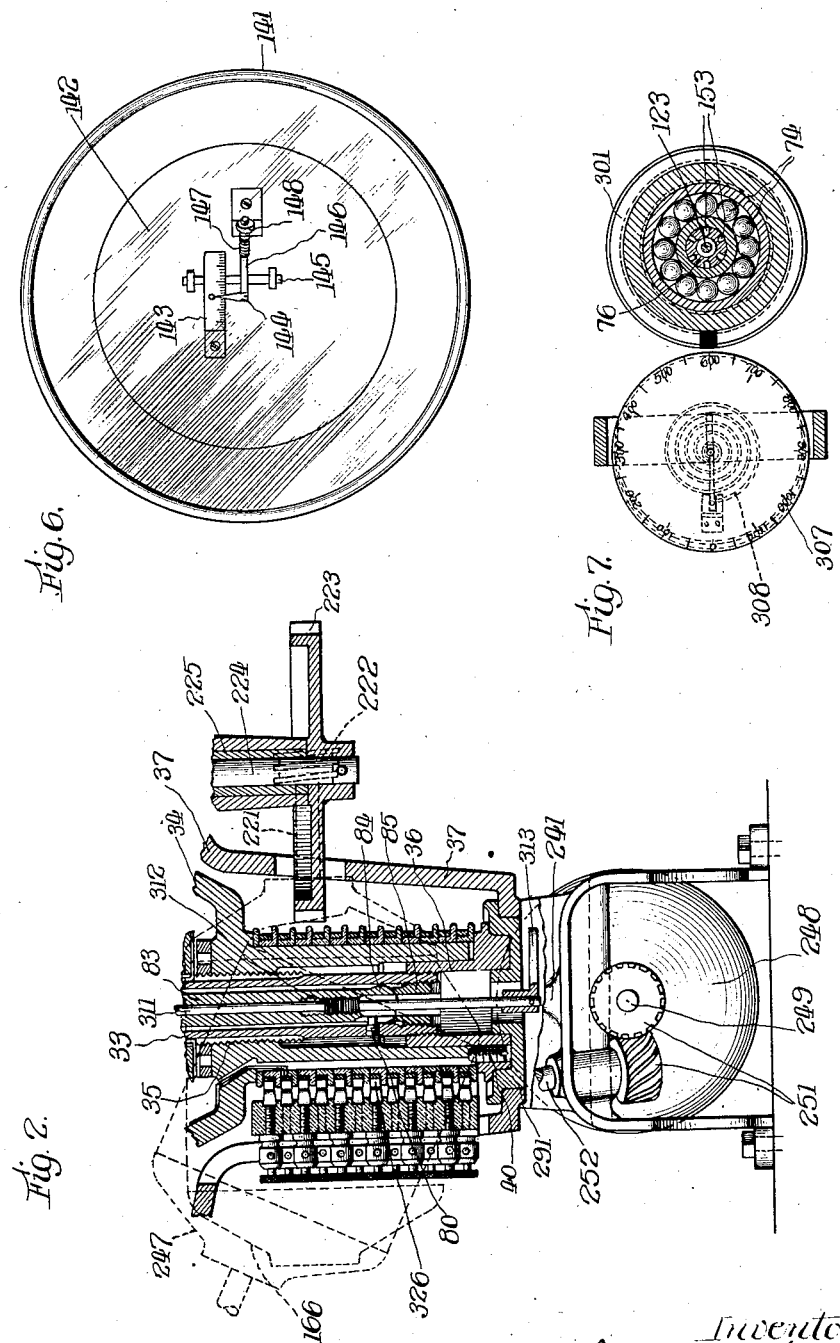
Figure 2 is a similar section of the lower portion of the mechanism, the constructions shown unitedly in Figures 1 and 2 illustrating the whole appliance.

As is clearly illustrated in the drawings, the novel appliance includes an electrically-revolved gyroscope designated as an entirety 21, comprising a suitable stator and a complementary rotor free to revolve on appropriate ball-bearings 22 and 23 on the outer end portion of a normally-horizontal, hollow arm or shaft 24, radially outstanding fixedly from a ring 25, equipped with aligned trunnions 26, 26 at right angles to the axis of the arm or shaft and revoluble in ball-bearings 27, 27 in a pair of spaced, upwardly-extended arms 28. 28 formed integral with a sleeve 29, rotatable on ball-bearings 31, 32 on an upright, hollow post or tubular support 33 screwed at 35 (Figure 2) into the base portion of an inner casing 34 of appropriate shape, and held at its lower end by a lock-nut 36 (locked to the inner casing by a screw 40) forming one element of a step-bearing for the inner casing in the lower portion of an outer casing 37, the bottom part of member 36 resting in a hardened steel step-bearing 291 designed to retain lubrication therein.

Such gyroscope is, therefore, free to precess around the upright axis of the post 33 on the ball-bearings 31, 32, and may rise and descend by reason of its trunnion connection with the bracket arms of sleeve 29.

So far as the construction has been described in detail, this gyroscope is subject to the action of gravity thereon, which causes its precession, but it is also subject to the action of inertia.

To overcome or neutralize such inertia action, the following specified cooperating instrumentalities have been provided.

A suitable weight 41, by means of a screw 42, is fixedly mounted on the outer end of a substantially-horizontal yoke 43, the two spaced arms 44, 44 of which, by means of appropriate ball-bearings, are rockingly mounted and supported on the radial trunnions 26, 26 just inside of the separated supporting arms 28, 28 of sleeve 29.

Thus ring 25 and yoke 43 are adapted to turn about the same horizontal axis of these trunnions.

In order to prevent vibrations, a soft-rubber cushion thimble 50 is interposed between the hub of such weight and the projection or part of the yoke to which it is attached by the screw.

Unless means were provided for sustaining such weight, it would fall, but it is held in position by an upright thrust-rod 45 (Figure 1) having at its upper conical end a bearing on the inner, similarly-shaped wall of a cavity or recess 46 in the lower central portion of the weight, the bottom end of the rod having a similar bearing on the top face of an arm 47, fastened to a shell or casing 48, enclosing an extremely-flexible coil-spring 49 having its outer end at 51 secured to the inside of the casing, and having its inner end fixed to the central shaft 52 mounted in bearings in arms 53 of a bracket fastened to or integral with, and hence revoluble with, the sleeve 29, such shaft being equipped with an exposed square end, a ratchet-wheel 55, and a coacting, spring pawl 54 mounted on the bracket, by means of which construction any suitable or desired adjustment of the tension of the spring may be made, whereby to cause it to exactly overcome or neutralize the weight of, or the action of gravity on, the part 41 and its associated elements.

The length and extreme flexibility or resiliency of the spring permit a slight vertical change of position of the weight without detrimentally or materially modifying its sustaining action thereon.

Figure 1:
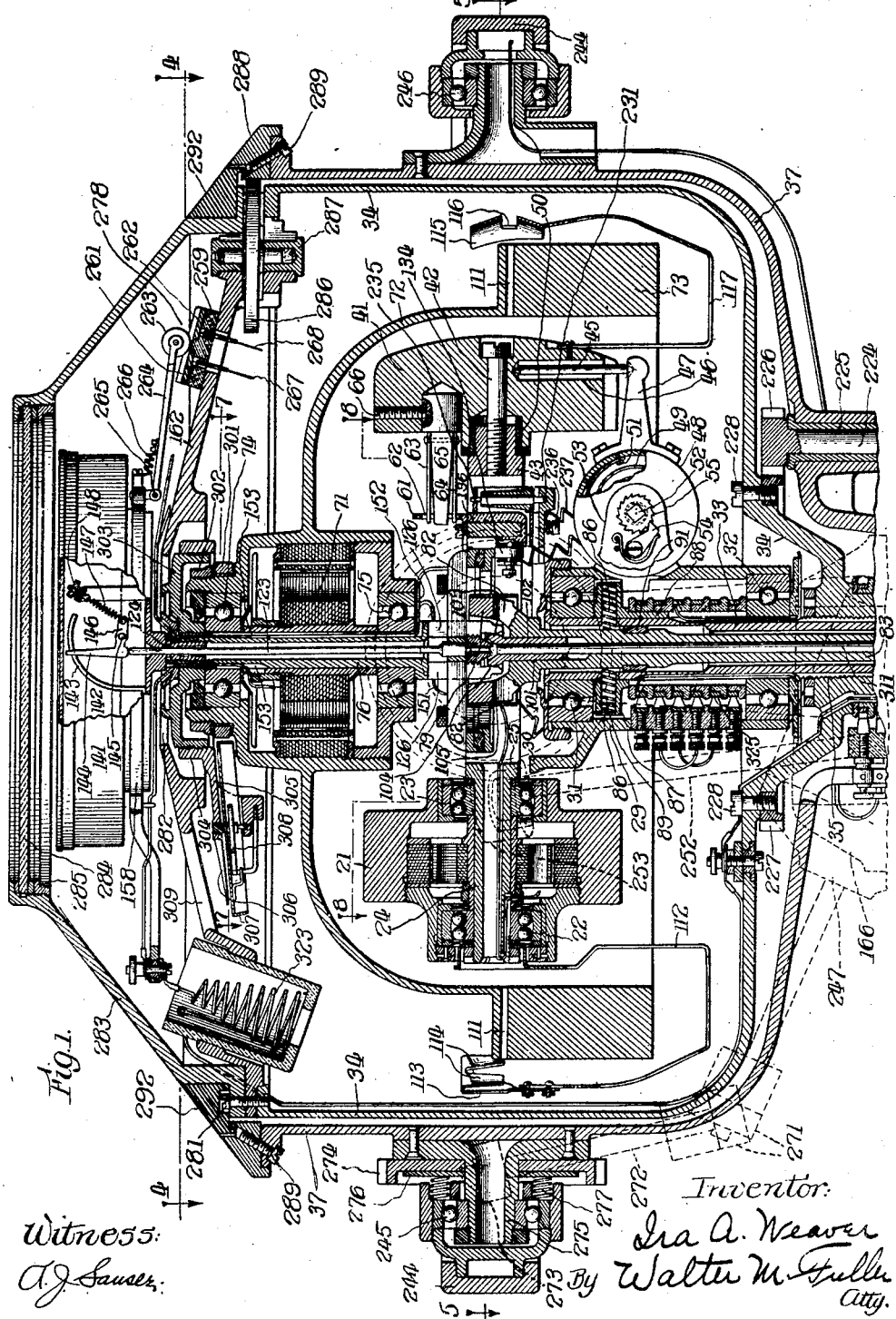
Figure 1 is a central vertical section through the upper portion of the device.

Ring 25, diametrically opposite the gyroscope 21, has a bracket 61 mounted thereon, equipped in its upstanding part with a rectangular aperture 62, loosely receiving the inner ends of two vertically-spaced, inwardly-directed leaf-springs 63, 64, fixedly mounted at their outer ends on a tapered block 65 also projecting into the opening 62 and having at its other end an enlarged head fastened by a screw 66 in a cavity in the inner face of the weight 41, as is clearly shown in Figure 1.

The spaced, upper and lower, flat springs 63, 64, as illustrated, are normally disposed with their planes substantially horizontal and are adapted, under certain circumstances, to be bent or flexed slightly in a vertical direction to perform a cushioning function between the weight and the ring, such connection becoming positive when the spring is flexed sufficiently to lie flat against the face of the tapered block.

It should be observed that the element 41 is not a counterweight for the gyroscope 21, because it and its companion parts are fully supported by the lifting and sustaining action of spring 49, and ordinarily both leaf-springs 63, 64 are out of contact with the upper and lower edges or margins of the aperture 62 and hence in a vertical direction the weight has no influence on the gyroscope.

Thus, the gyroscope is freely subject to the action of gravity thereon, and this action thereon is at its maximum advantage because of the location of the gyroscope at the outer end of a horizontal arm hinged at its inner end for vertical movement, or in other words, the gyroscope, exposed to the action of gravity, is on an arm outstanding horizontally at right angles to its support.

The action of gravity on such gyroscope is, therefore, substantially different from its influence on an oscillatory pendulum, because in the case of the gyroscope it acts with greatest effect and with a constant force to produce the horizontal precession of the gyroscope which establishes a definite vertical line, whereas in the case of a pendulum the force to maintain the pendulum vertical is constantly varying and when the pendulum is vertical there is no force present to maintain it in such position.

The descent of the gyroscope is limited by a projection 30 on the member 29 with which the axle of the gyroscope is adapted to cooperate, and ascent of the gyroscope is restricted by the engagement of the ring or some part carried thereby with the spring casing 48.

When the gyroscope 21 is precessing in a horizontal plane with its supporting arm substantially horizontal, of course the oppositely-positioned weight 41 is also revolving in practically the same horizontal plane, and, owing to the positive connections, without slack or looseness, between the gyroscope and the weight in this plane, the weight neutralizes the inertia of the gyroscope in such plane with respect to the vertical axis about which they turn, but it does not counterbalance or have any effect on the gyroscope because of the supporting and upholding action of the convolute spring 49 on the weight 41.

Under these circumstances, the outstanding gyroscope is subject to the action of gravity to maximum advantage which causes its horizontal precession and it is neutralized as to its inertia in such plane about its support.

In case the whole mechanism is raised or lowered vertically, momentarily the gyroscope would not be balanced as to its inertia in such direction, but just as soon as the slack or looseness is taken up or absorbed between the wall of the aperture 62 and its contained element 65, the inertia of the weight 41 is brought into action to neutralize or counteract the inertia of the gyroscope.

It will be perceived, therefore, that the weight of the gyroscope, while not balanced as to gravity, is balanced as to inertia with reference to its support in all directions.

The valuable result is that the gyroscope will always precess in a horizontal plane, or parallel with the face of the earth, that is to say, at right angles to the radius of the earth at that point, and will not be influenced by the bodily movement of the mechanism as a whole in any direction, as for instance change of speed of travel of its support.

If such a gyroscope were mounted on an airplane and were caused to travel above the face of the earth, the plane of precession of such gyroscope would at all times be parallel to the face of the earth or horizontal, that is to say its axis would always be vertical, and such gyroscope would automatically change its plane of precession with reference to a point in space to maintain such parallelism.

Stated somewhat otherwise, the plane of precession of the gyroscope is always at right angles to the direction of action of gravity thereon, but such direction changes as the airplane proceeds from one point to another over the earth's surface. That is to say, gravity always acts in a direction toward the center of the earth and that direction differs for all points of the earth's surface, such change of direction causing the change of plane of precession to keep it always horizontal.

We can be certain, therefore, that this plane will always be known and a vertical line is automatically established at any place where the airplane may be regardless of whether observations can or cannot be made of objects on the earth, or of celestial bodies.

The second, or complementary, electric-motor gyroscope denominated as a whole 71, comprising a suitable stator and a rotor, is neutrally mounted with respect to that point about which the first gyroscope precesses and about which it may rock upwardly or downwardly, that is to say, about the intersection of the vertical axis around which it precesses with the horizontal axis of the trunnions 26, 26, which, of course, coincides with the cutting of such vertical axis by the axis of arm 24.

Accordingly, the rotor of this gyroscope has a depending, inverted dish-shaped skirt, 72, enclosing the gyroscope 21 and the weight 41, the lower edge portion of such skirt being thickened or enlarged in cross-section to form a ring-shaped weight 73.

Gyroscope 71 revolves on its own substantially-vertical axis on ball-bearings 74 and 75 on a stationary, hollow post or shaft 76, having at its lower end opposite knife-edge projections 77, 77 (Fig. 9) resting in V-shaped recesses 78, 78 in the top face of a gimbal-ring 79 (Figs. 1 and 11), having similar cavities 81, 81 in its under face (at right angles to recesses 78, 78), receiving knife-edge projections or arms 82, 82 of a hollow post 83 (see Figures 9, 10, 11, 12, and 14).

The lower ends of recesses 78, 78 and the upper ends of cavities 81, 81 are in the same central plane of the ring, the structure comprising an antifriction universal mounting for the gyroscope shaft or axle.

The hollow post 83 at its bottom end has a ball-shaped joint 84 (Fig. 2) resting in a ball-socket step-bearing in the top face of a plug 85, threaded in the lower end of the element 33, whereby by adjusting such plug, the gimbal-ring 79 may be brought into exact center with the axis of gyroscope 21.

Post 83 is held against turning by a screw 80 (Figure 2) in the stationary tubular element or post 33 projecting inwardly into a short vertical slot in post 83.

This post 83 is of less diameter than the internal caliber of its encasing member 33, and is therefore capable of limited sidewise movement therein to prevent the transmission of vibrations from one part to the other, being normally held yieldingly in central position in such surrounding member by four, radially-disposed springs 86, 86 of which only two are shown in Figure 1 of the drawings. Each of such coiled springs is desirably housed in a socket 87 of a sleeve 88 mounted on the hollow post 33, the inner ends of such springs bearing on the part 83, the outer ends of the springs pressing against a confining ring 89, closing the ends of the sockets.

The centralizing action of these springs may, if desired, be supplemented by that of a soft-rubber cushion-ring 91 interposed between the two elements 83 and 33.

The top portion of post 83 has an enlarged bore 101 (Figure 1) receiving a hollow pin 102 (Figures 1 and 13) with a ball-shaped top end 103 received in a suitably formed socket 104 (Figures 1 and 9) in the lower end of the upper hollow post or shaft 76, the center of such ball and socket joint coinciding with that of the surrounding gimbal-ring universal-joint 77, 78, 79, 81, 82.

All strain in a horizontal plane is thus removed during change of speed or change of direction of travel of the support on which the gyroscope is mounted from the knife-edge supports by the enclosed ball and socket joint, the center of which is in exact register with that of the knife-edge structure, the entire combination forming a universal-joint with a minimum amount of friction and one that is capable of resisting considerable side thrust.

As a further protection, a band, or ring 105 is mounted on the surrounding gimbal-ring 79.

In case of accident, if the bearings cease to function properly the momentum of the rotor of the gyroscope being great, the end of the screw 80 would be sheared off, the lead wires at the top of the motor, not yet described, torn loose, and the gyroscope and the shaft would continue to spin in the cup-shaped bearing of element 85.

It will be seen that, so far as now described, the mechanism comprises two, unrelated, gyroscopic appliances, the one on the outer portion of an arm hinged at its opposite end for vertical movement and free to revolve about an upright axis, which rotation is effected by the precession of the gyroscope, the latter being subject to the action of gravity applied to maximum advantage which causes the precession, but neutralized as to inertia with respect to its support, the second a neutrally-mounted gyroscope, balanced both as to gravity and inertia with relation to its support, and mounted so that the center of mass of the rotor and its motor driving mechanism coincide with the center about which the first gyroscope precesses and around which it may rise and descend, such neutrally-mounted gyroscope being so mounted as to permit limited or restricted tilting of its axis or of the plane of rotation of its rotor in any direction.

Returning now to the first gyroscope 21, in order that it may precess in a horizontal plane with the axis of its supporting arm or axle 24 horizontal, its mounting, permitting such precessional rotation, must be wholly free from friction, and, inasmuch as electric contact slip rings and companion brushes, described hereinafter, are employed to lead the electric currents to the motor of such gyroscope and to the other parts of the mechanism, to maintain the precessional condition specified, the friction not only of the bearing but also that of such cooperating electrical contacts must be exactly neutralized.

If such friction is not fully overcome, the arm or shaft 24, during its revolution with the precessing gyroscope, will gradually descend, and, if it is more than compensated for, such arm will gradually rise, neither of which objectionable conditions should be permitted to occur, except within small limits.

Accordingly, the ring weight portion 73 of the rotor gyroscope 71 is provided therethrough with a plurality (in the present instance six) of equally-spaced, obliquely-arranged, tapered holes 111, 111, as shown in Figure 5, with their smaller ends at the outer side of the weight and their larger ends at the inside thereof, these apertures being at an angle of about 10 degrees with the corresponding radii, whereby the inner ends of the holes will be somewhat in advance of their outer ends, thus causing a continuous, partly-oblique, outward discharge of air through the several apertures.

Arm or axle 24 has mounted thereon a bent, a metal strip 112 (Figure 1), extended down around and upwardly outside of the ring-weight 73, carrying at its top a curved, sheet-metal element 113 equipped with a plurality of tapered, downwardly-extended vanes 114 (Figures 1 and 5) the side edges of which converge downwardly, their lower edges being about on a level of the holes 111.

The jets or blasts of air issuing from such apertures strike against the vanes and tend to carry or drag gyroscope 21 around with the rapidly revolving gyroscope element 73, as will be readily understood.

In other words, a portion of the power of the gyroscope 71 is employed to overcome the friction of the bearing and that of the rubbing electrical contacts associated with the companion precessing gyroscope, whereby to assure that the latter will substantially maintain its horizontal plane of precession and will neither rise nor fall to any material extent.

Stated somewhat otherwise, the blasts of air, discharged from the holes of the clockwise-revolving rotor of the one gyroscope, impinge against the blades or vanes carried by the other gyroscope and so set that these air currents tend to hasten the clockwise precession of such complementary gyroscope, resulting in preventing descent of its plane of precession and of the arm or shaft on which it is mounted.

If the precessing gyroscope falls slightly, a greater portion of the tapered blades or vanes are brought into the field of action of the air-blasts, thereby increasing the action of the air jets thereon and hastening the precession of the gyroscope sufficiently to cause its rise to a position in which the arm 24 is horizontal.

If the precession is hurried too much, gyroscope 21 will rise above the position in which the axis of its shaft is horizontal, and a less or no portion of the vanes will be exposed to the action of the air jets, resulting in the descent of the gyroscope to the proper level.

Thus by this simple and efficient means the precession of gyroscope 21 is automatically maintained at all times in the required horizontal plane, in which the arm 24 is horizontal.

These air blasts are also used to dampen vertical oscillations of the inertia counter-balancing weight 41. Such jets play against a vertically inwardly concave or V-shaped vane 115 having a central horizontal slot 116 mounted on a bent arm 117 carried by the weight 41 and formed to escape the rotor of gyroscope 71, the slot being normally on a level with the air jets delivered outwardly by the passages in member 73. Obviously the shape of member 115 tends to maintain the inertia weight in normal position and discourages vertical vibrations or oscillations thereof.

Considering again the neutrally-supported gyroscope 71, subject to the action of neither gravity nor inertia with relation to its support, it will tend to maintain unchanged its plane of rotation with respect to any fixed point in space, but, inasmuch as the earth rotates one degree every four minutes from west to east, there would be a relative turning of such plane of rotation of the gyroscope with respect to the earth.

If such gyroscope were free to revolve, its plane of rotation would seemingly turn completely over in twenty-four hours because of its support on the earth, but as a matter of fact, the gyroscope would maintain its plane of rotation and the earth would make a complete revolution, yet relatively to the earth, the gyroscope would turn over.

Such action, however, is not permitted in the present device, since it is preferred to intermittently tilt the plane of rotation of such gyroscope by the precession of the other gyroscope to maintain such plane parallel to the face of the earth with its axis vertical, when the instrument is stationary, thus exactly compensating for the earth's rotation, or stated differently, the plane of rotation of the rotor of the gyroscope is kept parallel to the horizontal plane of precession of the companion gyroscope when the appliance is not traveling.

The following specified coacting elements are provided to perform this function.

A control-ring 121 has an elevated, diametrical cross-bar 122 (Figs. 5 and 16) equipped with an elongated, cylindrical stem 123 at a slight angle to the axis of the ring, such stem near its upper end being slidingly accommodated above the cross-bar in a suitable bearing 124, screwed into the top end of the hollow post or shaft 76, the lower end of the stem, below the cross-bar, being slidable in a jewel-bearing 125 (Fig. 9) screwed into the lower end of the same post 76, the cross-bar by occupying opposite slots 126, 126 in the lower end of such post or shaft preventing rotation of the ring with respect to the post, the latter in turn being incapable of rotation relatively to the inner casing.

Secured to the under face of this ring is an insulation washer 127 cut away for about 184 degrees to receive two arcuate contacts 128 and 129 fastened thereto with their adjacent ends spaced from one another by a very narrow strip of insulation 131, the two contacts having the usual binding posts 132, 133 for the attachment of electrical wires connected to an azimuth-motor described hereinafter, the bottom faces and the interior curved edges of the washer, contacts and insulation strip being flush with one another to present smooth surfaces.

Such control-ring by its lower bearing is limited as to its downward movement so that the middle portion or section of its sloping lower face, that is the part midway between the upper and lower edges of its bottom face, is in exact alignment with the knife-edge bearings of the gimbal-ring 79, which is also in precise alignment with the axis of the gyroscope 21.

The under face of the control-ring coacts with a metal-roller 134 (Figures 1 and 8) revolubly mounted in a metallic member 135 carried by an insulation-block 136 and supplied with a binding post 137 in electrical connection with the roller.

This block of insulation is grooved on its top face to receive and be fastened in any appropriate manner to that part of ring 25 directly opposite the arm or shaft 24, roller 134 being so located that its top is in exact register with the axis of the latter.

As the roller precesses in a substantially horizontal plane with gyroscope 21, there would be no vertical movement of the control-ring, provided the latter were also horizontal, but since the rotation of the earth causes the plane of revolution of the rotor of the gyroscope 71 and the plane of the associated control-ring, the stem of which is in the rockable shaft of such rotor, to tilt relative to the earth, the horizontal travel of the roller causes a righting of such plane by the vertical movement of the stem 123 in cooperation with an indicator described hereinafter.

This roller makes contact with the bottom face of the control-ring during only one-half of each horizontal precessional revolution of the roller, and as it precesses, for example, fifteen turns per minute, and inasmuch as the earth turns one degree each four minutes of time, there would be sixty movements of the stem or plunger for each degree.

It is desirable that the plane of revolution of the rotor of the gyroscope 71 should remain as nearly horizontal as possible, because of the employment of the air-blasts to overcome or counterbalance the friction of the precessional gyroscope on its support, and, accordingly, the stem 123 is positioned, as explained above, at a slight angle to the axis of the control-ring, so that the center of the insulation portion of its bottom face is downward if the stem is disposed exactly vertically.

The minimum tip of the gyroscope would be east a degree or two and its maximum tilt a degree or more westward, its average position being substantially horizontal.

Bearing 124, mentioned above, constitutes a portion or stem of a casing 141 of an indicator, illustrated more or less diagrammatically and designated as a whole 142, comprising in its make-up in the present instance, although many other types are suitable, a scale 143 (Figures 1 and 6) graduated in opposite directions from an intermediate zero point and coacting with which is one arm 144 of a bell-crank lever fulcrumed at 145, the other arm 146 being connected to one end of a contractile coil spring 147, the opposite end of which is associated with an adjustable screw 148 of usual construction and the manipulation of which modifies the tension of the spring, the stem 123 bearing against the arm 144 as is clearly illustrated in Figure 1.

If the stem of the control-ring were free to slide in the axle of gyroscope 71, it would work idly therein and perform no righting function on the axle. The spring of the indicator constitutes a cushion between such stem and the axle resisting the action of the former and therefore permitting it through the spring to right the axle.

Assuming that the element 148, when the instrument is stationary, has been adjusted so that the roller and control-ring in their cooperative wedging and lifting action in frequently and intermittently restoring or righting the neutrally-mounted gyroscope to its normal position with its axis vertical, thus just compensating for or neutralizing the rotation of the earth, will cause the needle or index of the indicator to just reach the zero graduation of the scale when the tension on the spring is at its maximum during any individual lifting or righting movement of the control-ring stem, then during travel of the airplane and the instrument thereon, the deviation of the index from such zero graduation of the scale when the spring is under maximum tension will be proportional to and will represent the angular change of the plane of rotation of the gyroscope due to its travel over the face of the earth, and such speed of travel may be read on the scale.

Figure 4:
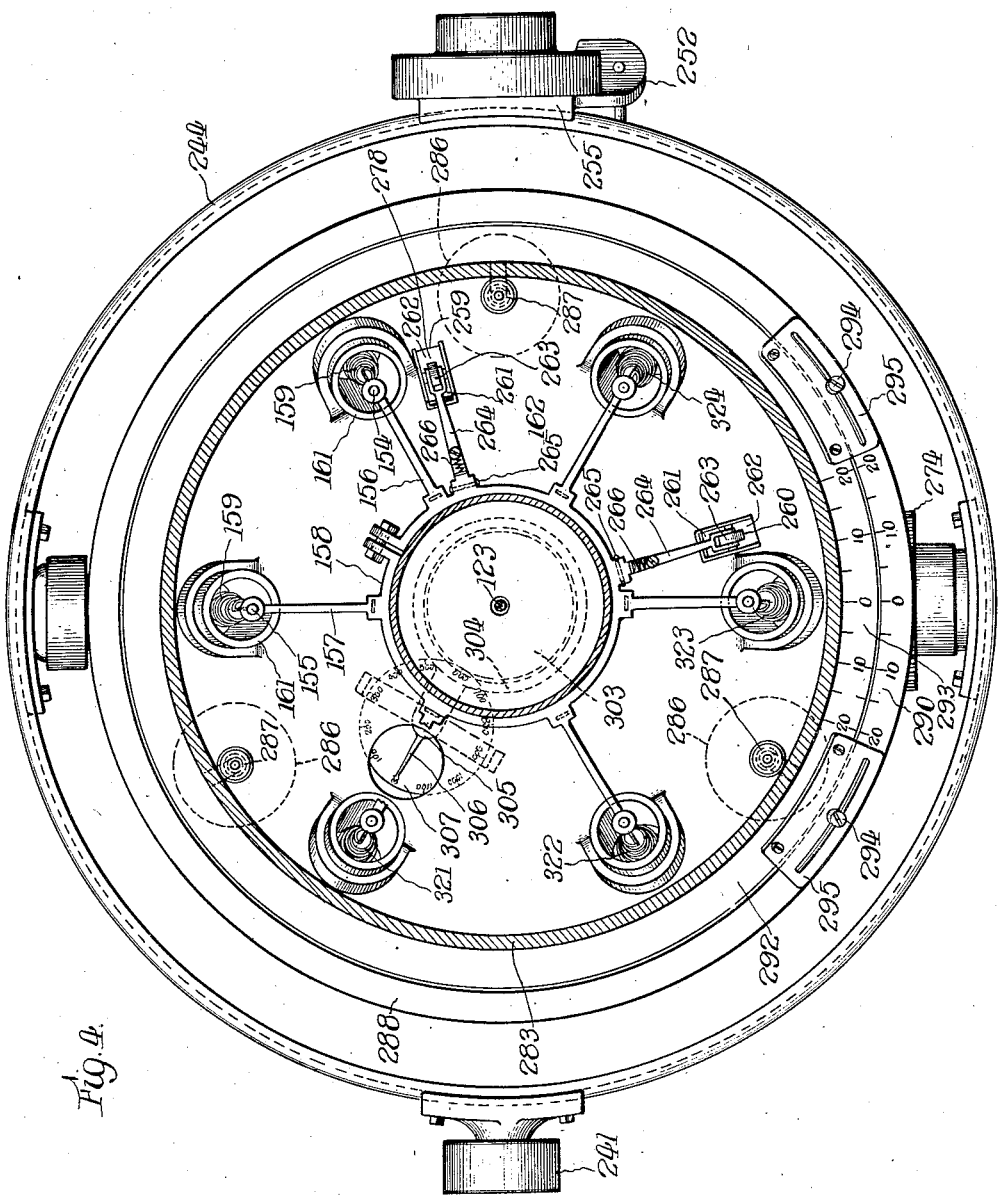
Figure 4 is a horizontal section on line 4—4 of Figure 1 on a reduced scale.

Referring now to the second function of the roller 134 in governing the operation of the azimuth-motor controlling the position of the inner casing, the control-ring contact 128 and the companion contact 129 are connected by two wires 151 and 152 secured to their binding posts 132 and 133, and are extended upwardly each through a single groove or passage 153 in the post or shaft 76 to connections 154 and 155 on the ends of two arms 156 and 157 of a spider 158 fastened in any approved manner to the casing 141 (Fig. 4).

Each member 154 and 155 is connected to one end of a very flexible, coiled, conductive wire 159 housed in an insulation-cup 161, mounted in any suitable way in an openwork or skeleton cover 162 on the top of the inner dish-shaped casing 34.

The other ends of these two, flexible, coiled elements 159 are connected by wires 163 and 164 to an electro-magnetic controller 165 (Figure 21), governing the action of the shunt-wound azimuth-motor 166 through the field-coils of which an electric-current flows all the time.

The controller comprises a vertical, substantially-triangular, grounded, metallic block 171, which has mounted thereon the two cores 172 and 173 of the magnet, equipped with spaced, opposed pole-pieces 174 and 175 between which is an armature 176 mounted on the upper end of and insulated from an upright leaf-spring 177, fastened to, but insulated from the block 171, such spring being connected by a wire 178 to one pole of a source of electric energy, such as a battery or generator 179.

On its opposite sides, spring 177 is equipped with contacts 181 and 182 normally touching similar contacts 183 and 184 on analogous leaf-springs 185 and 186, likewise mounted on but insulated from the block 171.

Spring 186 and a spring 192 at the side of spring 185 are both electrically connected to a wire 187 connected to one of the brushes 188 of the reversible motor 166.

The outer face of each of the springs 185 and 186 is provided with blocks of insulation 189 and 191, respectively, adapted under certain conditions to contact with the spring 192 and with a corresponding spring 196 at the side of the spring 186 also mounted on and insulated from the block 171.

Springs 185 and 196 are electrically connected to a wire 205 connected with the companion brush 201 of the motor.

On its outer face, spring 192 carries a contact 193 adapted to co-operate with a contact 194 on the inner face of an outer leaf-spring 195, mounted on and in electrical contact with block 171 which may be considered as a ground.

Similarly, spring 196 has a contact 197 designed to coact with the contact 198 on a leaf-spring 199 mounted on and electrically connected with block 171.

Wire 163 is connected to one end of the magnet coil 202 encircling core 173, the opposite end of such coil by a wire 203 being united to one end of the motor field-winding 204, the opposite terminal of which by a wire 206 and a wire 207 is joined to the companion terminal of the battery or generator 179 and by the wire 208 to the block 171.

In somewhat similar manner, the wire 164 is coupled to the upper end of a magnet-coil 209 encircling the core 172, the opposite end of such coil by a wire 211 being connected to the wire 178 and to the same end of the field-winding 204 that the wire 203 is associated with.

The metal-roller 134 referred to above, and which is designed to regularly but interruptedly co-operate with the contacts 128 and 129 of the control-ring, is connected by a brush and slip-ring mechanism, described more in detail below, and by a wire 212 to the metallic-block 171.

Under normal conditions, when the roller 134 is not in contact with either of the contacts 128 or 129, for example, when it is beneath the strip of insulation between them, the armature 176 occupies the middle position illustrated in Figure 21, since neither coil of the electro-magnet of the controller is energized.

When, however, during the rotary travel of the roller, it comes into contact with the electrode 129 connected to the wire 163, the right hand half of the controller will become energized, by reason of the electric current from the battery or generator passing through the following circuit; wire 178, wire 203, coil 202, wire 163, contact 129, roller 134, wire 212, plate 171, wire 208, and wire 207.

Such energization of the magnet draws the armature 176 to the right, thereby breaking the connection between the springs 177 and 186, it being understood that before such energization of the magnet one pole of the battery was connected to both brushes of the motor through the following connections: 178, 177, 181, 183, 185, 205, and 178, 177, 182, 184, 186 and 187, under which circumstances the motor would not operate.

As soon as the armature 176 moves to the right as specified, the contact between the parts 182 and 184 is broken, and, by reason of the insulation of block 189 engaging spring 192 and pushing it over to the right an electric connection is made between the springs 192 and 195.

Under these circumstances the motor becomes energized and revolves in one direction.

The circuit under these conditions is as follows: battery or generator 179, wire 178, spring 177, contacts 181 and 183, spring 185, and wire 205 to brush 201, the other brush 188 being connected through wire 187, spring 192, contacts 193 and 194, spring 195, block or ground 171, and wires 208 and 207 to the battery or generator.

As explained above, the field of the motor is energized all the time by reason of its direct connection with the battery or generator.

When the roller 134 engages the contact 128, then the controller will be actuated to revolve the motor in the opposite direction. Under these circumstances, the current from the source of energy 179 flows through wire 178, wire 211, magnet-coil 209, wire 164, contact 128, roller 134, wire 212, plate or ground 171, wire 208, and wire 207, thus causing the armature 176 to be pulled to the left.

The circuit from the battery or generator 179 to the motor will then be as follows: wire 178, spring 177, contacts 182 and 184, spring 186, wire 187 to the motor-brush 188, and from the companion brush 201, wire 205, spring 196, contacts 197 and 198, spring 199, plate or ground 171• and wires 208 and 207 back to the battery or generator.

It will be observed that under these circumstances the current flows through the motor in the opposite direction from which it did when the armature was pulled to the right causing a reverse rotation of its armature shaft.

The shaft 221 of this azimuth-motor 166 (Figure 5) is equipped with a worm 222 co-operating with a worm-wheel 223 (Figures 2 and 5) on an upright shaft 224, suitably mounted in a bearing 225 depending from the outer casing 37, the upper end of the vertical shaft being provided with a pinion 226 (Figure 1), the teeth of which are in mesh with a ring-gear 227 fastened by screws 228 to the lower portion of the inner casing 34.

Thus, as the azimuth-motor is energized, as indicated above, to revolve in either of opposite directions as occasion requires, the inner casing 34 will be turned similarly with reference to the outer casing.

From this description of the construction and operation of this portion of the mechanism, it should be apparent that as the control-ring is always tilted and the roller 134 contacts with only one-half of it during its revolution, and, since the segmental contacts 128 and 129 extend conjointly a few degrees beyond 180 degrees, the travel of the roller not only neutralizes the tip of or rights the gyroscope by pushing the control-ring upwardly, but it also contacts alternately with small portions of the opposite ends of such contacts, thus alternately actuating the motor in opposite directions, thereby causing the inner casing to oscillate slightly on opposite sides of the true meridian.

This forms a convenient means of ascertaining whether or not the instrument is operating properly, the movement of the inner casing being approximately one degree on either side of the true meridian.

When the roller contacts with either segment of the control-ring, the azimuth-motor moves to rotate the inner casing and the ring in the direction to move such contact from the roller and to bring the long insulation section above it. Therefore, the tilt of the control-ring will always be such that the insulated portion would always be restored to down position.

Also, if the control-ring, which is held against rotation with respect to the inner casing by reason of its cross-bar and slot connection with the hollow post or shaft 76 which does not rotate and which is secured to the inner casing, and the inner casing are turned to bring one of the contacts on the down half of the ring more than the companion contact, the motor will be correspondingly actuated to restore the ring and casing to true meridian position, subject, of course, to their normal small oscillations specified.

The meridian distingushing characteristic of the appliance is due, of course, to the fact that the plane of rotation of the rotor of the gyroscope and its axis tends to tip west by reason of the definite direction of rotation of the earth, and accordingly the instrument can be relied upon to faithfully and effectively perform this function of indicating the points of the compass.

In order to ascertain the drift of the airplane on which the gyroscopic appliance is mounted, the following parts of the mechanism are employed:

A horizontal yoke 231 (Figures 1, 8 and 20) having the ends of its two arms weighted at 232 and equipped with a pair of upstanding, electrical, contact brushes 233 and 234, is fulcrumed on a vertical pin 235 mounted in any approved manner on the insulation block 136 directly opposite the axis of gyroscope 21, the two contact brushes being disposed on a diameter of and inside of the central hole of the control-ring 121 and spaced apart on the line of the trunnions 26, 26 a distance slightly less than the internal diameter of the ring (Fig. 5).

Since the pivot-pin 235 is vertical, the yoke is subject to inertia in a horizontal plane, and as the segment contacts 128 and 129 of the control-ring are exposed on the inner circular face, as well as the under face, of the latter, one or the other brush 233 and 234, during their rotation with the precessing gyroscope 21, will be brought into contact with such segment by reason of such inertia, provided the airplane is manipulated to subject the yoke to the action of inertia.

On its under side, yoke 231 is supplied with a binding-post 236 to which is connected through slip-rings and coacting contact-brushes, described hereinafter, a grounded wire 237 (Figures 1 and 21) associated with a normally-opened spring pressed push-button switch 238, the movable contact 239 of which ordinarily closes a gap in wire 212.

When the push-button is pressed, such switch causes a break in wire 212 and closes a gap in wire 237, all as will be readily understood from the illustration in Figure 21.

Figure 3:
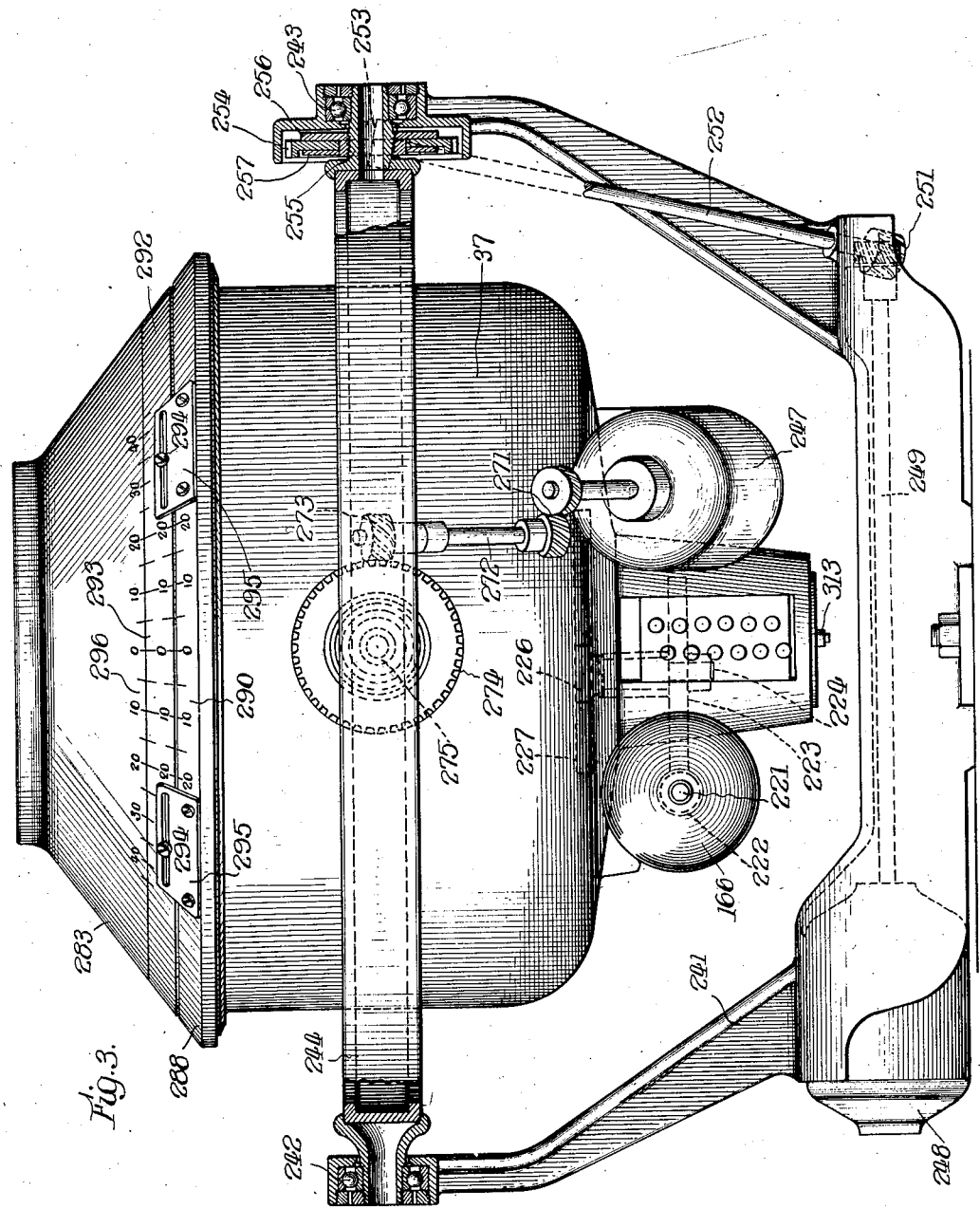
Figure 3 is an elevation of the device at right angles to the section of Figure 1, a portion of the mechanism being shown in section.

Turning now to the manner of mounting and automatically controlling the position of the instrument, it will be observed that the stationary yoke or bracket 241 (Figure 3), rigidly secured to the object supporting the instrument, by means of ball-bearings 242 and 243, rockingly supports a gimbal-ring 244, which in turn by ball-bearings 245 and 246 (Figure 1) similarly supports the outer casing 37, the latter being automatically maintained in substantially vertical position by two electric-motors 247 and 248 (Figure 3), which control respectively the movement of the casing in the gimbal-ring and the movement of the latter in the supporting yoke.

The shaft 249 of the motor 248, by means of intermeshing spiral-gears 251, rotates a suitably-mounted inclined shaft 252, equipped at its upper end with a worm 253 meshing with a worm-wheel 254, secured to a hub 255 projecting from the gimbal-ring 244, such worm-wheel being mounted between two friction plates 256 and 257 which hold it against rotation on the hub, the friction being more than sufficient to control the movement of the gimbal-ring under normal conditions, but, should the motor cease to function when its circuit is closed as indicated below, the strain produced by the gyroscopes would cause the worm-wheel to slip on the gimbal-ring hub and prevent damage.

The means, designated as a whole 260, for controlling the electric current through such motor comprise the following parts, which are like those having the same reference characters of a similar switch 278 referred to hereinafter. An insulation block 259 (Figure 1) mounted on the cover 162 carried on the top of the inner casing 34, is equipped with inner and outer spaced electric contacts 261 and 262 between which a narrow strip of the insulation block extends. Coacting with these contacts and adapted to engage the one or the other, as the case may be, and normally resting on the separating strip of insulation between them, is a roller contact 263 (Figures 1 and 4) on the outer end of an arm 264 hinged at 265 to the inner ring portion of the spider 158, being electrically connected thereto, which constitutes a ground, by a flexible wire 266. By means of wires 267 and 268 (Figure 1) connected to the contacts 261 and 262, the motor 248 is governed, through a controller not shown, similar to, or substantially like that illustrated in Figure 21, described previously in connection with the operation of the azimuth-motor.

The shaft of the other motor 247 (Figure 3) by means of spiral-gearing 271, drives an appropriately-mounted shaft 272, equipped with a worm 273 in mesh with the teeth of a worm-wheel 274 on one of the hubs 275 (Figure 1) outstanding from the outer casing 37 and associated with the gimbal-ring 244 through the ball-bearing 245. Worm-wheel 274 is held against the flange of such hub by a plate 276 pressed against the face of the worm-wheel by a plurality of coil-springs 277, thus affording sufficient friction between the worm-wheel and the hub to control the position of the casing under normal circumstances, but providing a safety means in this direction, should the control motor cease to operate.

This motor is governed by co-operating contacts designated as a whole as 278 (Figure 4), like the parts 261, 262 and 263, but positioned 90 degrees away therefrom, this switch or controller 278 being connected to its motor through an electric-controller, not illustrated, as in the other instance.

These two control-motors, as well as the azimuth-motor specified, are of the low voltage type and reversible.

It will therefore be apparent, that a slight tip of the outer casing, either to the right or left, would start the stabilizing motor 247 and bring the corresponding roller-contact 263 of switch 278 to a neutral point between the two companion contacts 261 and 262, thus breaking the circuit of such motor at the proper time.

The fore and aft movement of the casing is controlled by the other motor 248 by the like electric contact mechanism 260 positioned 90 degrees from the other one.

Inasmuch as the spider 158 is mounted indirectly on the hollow post or shaft 76 of the gyroscope 71, and since the plane of rotation of the rotor of the latter is maintained substantially horizontal by the precessional rotation of the companion gyroscope 21, the positions of the rollers of the two contact mechanisms 260 and 278 are in large measure stabilized in their coaction with their companion contacts and the associated motors, and the positions of the outer and inner casings are stabilized within a limited degree, the latter being carried by the former.

The element 162 is fastened over the top of the inner casing by means of a plurality of screws 281, the central aperture 282 of such member 162 limiting the tilting movement of gyroscope 71 in case the stabilizing-motors should fail to act.

These screws 281 also fasten over the top of the inner casing a sloping cover 283 centrally provided with a glass-window 284 held in place by a threaded clamping-ring 285, or in any other appropriate manner.

Member 162 is also fitted with three, equally-spaced, horizontal rollers 286 revolubly mounted in part 162 by suitable bushings 287, such rollers bearing at their outer edges against a steel-ring 288 secured to the top of the outer casing by screws 289, the outer sloping face of such ring being graduated at 290 for a portion of its circumference.

Adjacent to ring 288 and accommodated in a circular groove or cavity of the inner casing, I provide a lubber-ring 292 graduated on its outer sloping face at 293, such ring being adjustably mounted with relation to ring 288 by screw and slot connections 294 with arms 295 (Figure 3) carried by such outer casing ring.

Any appropriate construction is employed to prevent leakage of water into the interior of the instrument at this portion of the appliance.

The inner casing cover 283 is also graduated at 296 (Figure 3) its zero marking being preferably a true north.

In order that the approximate speed of gyroscope 71 may be ascertained at a glance, a C-shaped permanent magnet 301 (Figures 1 and 7) is secured on the upper portion of the rotor of such gyroscope, being held in place by a threaded collar 302 on the hub of such rotor. A nut 303 screwed on the upper end of the hollow post or shaft 76 has a ring 304 thereon provided with an outstanding arm 305 (Figures 1 and 4), equipped with a pointer or index 306, such arm having revolubly mounted thereon a sheet-metal flanged disc 307 (Figures 1, 4 and 7) with a slight air-gap between its periphery and the magnet 301, whereby the rotation of the latter tends to drag the disc around with it. The top face of the disc 307 is graduated to correspond to revolutions per minute and the disc is equipped with a hair-spring 308 tending to hold it at the zero mark.

It will be seen from this construction that the magnetic drag of the magnet 301 will cause the disc 307 to be turned, bringing the figures on its top face under an opening 309 in the member 162, whereby the reading may be ascertained through the window 284.

To protect the knife-edge bearings of the universal-joint while the gyroscope 71 is coming up to its maximum speed and while the airplane is taking off of the ground or landing, the device may be provided with an elongated plunger 311 (Figures 1 and 15) extended through the center of a hollow shaft 83, a small portion 312 thereof being threaded therein, the lower protruding end of such plunger having a handle 313 by means of which it may be rotated and advanced upwardly by the screw-threads. This action lifts the gyroscope slightly off of the knife-edge bearings, but not from the center ball thrust bearing.

The electrical connections for the three-phase alternating-current electric-motor of the gyroscope 71 are made through the corresponding number of flexible or coil connections 321, 322 and 323 (Figure 4) in substantially the same manner that the electric circuits for the segments of the control ring are made through the other like connections 159, 159, the sixth or remaining flexible conductor 324 being employed for an electrical ground connection.

At 325 (Figure 1) I have shown a number of stationary collector-rings mounted on the post or sleeve 33 and their associated contact-brushes carried by the rotary bracket member or sleeve 29, the brushes having the usual binding posts for connection with the several wires.

In similar manner, a plurality of collector-rings and contact-brushes 326 (Figure 2) are employed between the lower portions of the inner and outer casings which are capable of movement relatively to one another.

These two groups of rings and brushes with suitable connecting wires afford convenient means for completing the electric circuits of the companion gyroscope 21 and the other parts of the mechanism described, but to avoid complexity in illustration these connections have not been fully shown, yet no difficulty will be encountered in understanding them sufficiently to make the structure and function of the apparatus perfectly clear.

*Operation.*

Assuming that the instrument is mounted on a stationary airplane, that the two gyroscopes are supplied with electric energy through their conductors, that the rotors thereof are revolving at the required speed in the customary manner, that the vaned member 113 has a proper adjustment whereby, by overcoming the precessional friction of the gyroscope 21, it maintains the plane of precession of such inertia-counterbalanced gyroscope substantially horizontal with its supporting arm or axle also practically horizontal, and, assuming that the precessional travel of roller 134, carried by the horizontal precessing gyroscope 21 and acting on the neutrally-mounted gyroscope 71 through the control-ring and the spring 147 of the indicator, is maintaining the axis of such neutrally-supported gyroscope substantially vertical, thereby compensating for the angular rotation of the earth at that latitude, the operator adjusts the tension of spring 147 of the indicator until the needle thereof, during its intermittent oscillations, reaches exactly the zero graduation of the scale at that end of its strokes representing the greatest tension to which it is subjected under these conditions.

The roller 134 in traveling around beneath and in cooperation with the lower face of the inclined control-ring slides the latter upwardly in the universally-mounted axle or shaft of the neutrally-supported gyroscope with a constant movement during its first quarter of a revolution, thereby effecting the maximum compression of the indicator spring through which it acts on the axle or shaft to keep the axis of such gyroscope vertical and thus compensate for the rotation of the earth.

During the next succeeding quarter of the revolution of the roller the strain imposed on the spring during the first quarter is gradually reduced to zero.

Therefore, in applying the force under varying intensity throughout one-half of the revolution of the roller, the gyroscope is not only caused to right itself, but any oscillations tending to be set up will be dampened out or eliminated.

Such action of the roller on the gyroscope causes the upper end of its axis to slightly precess during its righting movement, the degree of such precession depending upon the number of precessional revolutions of the roller per unit of time.

During the remaining half of the substantially-horizontal revolution of the roller, it is out of contact with the control-ring due to the tilt of the latter.

If the instrument adjusted and operating, as described above, is moved over the surface of the earth toward the equator, thereby changing its latitude, the needle of the indicator in its oscillations, will pass beyond the zero graduation, and, conversely, if the instrument travels toward the pole or away from the equator, the needle during its movements will not reach such zero position owing to the change of latitude. In the first instance, the travel of the needle beyond the zero point is due to the greater force required to maintain the axis of the neutrally-mounted gyroscope substantially-vertical, for the reason that at the equator, the axis of such gyroscope is substantially perpendicular to the axis of the earth, whereas, as the instrument approaches the pole, such angle changes, and less force is required to keep the axis vertical.

It is necessary, therefore, for the operator to be provided with a suitable chart or tabulation for latitude and speed in order to interpret correctly the readings of such indicator.

Any travel of the instrument over the face of the earth will tend to cause the axis of such neutrally-supported gyroscope, and consequently its plane of rotation, to tilt or tip, and the actual direction of such tilt will be in the direction of the resultant of the two component angular forces acting thereon, the one due to the rotation of the earth and the other due to the travel of the instrument over the earth.

Remembering that the speed of rotation of the surface of the earth at the equator is approximately 1,000 miles per hour with a diminishing speed of rotation toward either pole, and assuming that the speed of rotation of the earth's surface at any selected intermediate latitude is 700 miles per hour, and that the airplane is now traveling directly eastward at a speed of 100 miles per hour, it will be apparent that the two forces referred to act conjointly to tilt the axis of the neutrally-mounted gyroscope to the west.

The upper end of the axis of the gyroscope will tilt west until the tension of the spring of the indicator overcomes the additional angular movement by reason of its travel eastward and the needle of the indicator will pass beyond the zero point on each actuation and such extent of travel beyond the zero point indicates the speed of travel of the instrument at that moment.

If the airplane were traveling westward instead of eastward, the axis of the neutrally-mounted gyroscope would tip toward the east, because the travel of the instrument over the face of the earth, it being remembered that the effect of the rotation of the earth is exactly neutralized from a stationary position of the instrument, and the needle of the indicator during its oscillations would fail to reach the zero point, the extent of such failure representing the speed of the airplane at that instant.

By taking frequent speed readings and also taking account of time, the total amount of travel of the airplane can be readily determined.

Assuming now that the airplane and the instrument mounted thereon travel on a meridian from a predetermined latitude, such as the one selected above, at which the travel of the earth's surface would be 700 miles per hour, and assuming furthermore that the speed of travel of the airplane is 100 miles per hour, the axis of the neutrally-supported gyroscope will now tilt in a reverse direction to the travel of the airplane until the tension of the spring of the indicator counterbalances the angular movement due to its travel over the face of the earth toward the equator. As the latitude continually changes, causing the gyroscope to assume a different position in relation to the earth's axis, and increasing the force necessary to compensate for the angular movement due to the earth's rotation, the needle would constantly indicate higher values, for the reason that the gyroscope is changing its position relative to the axis of the earth.

If, during an hour's travel in this direction, the needle of the indicator shows on the scale a reading corresponding to a change of latitude of 100 miles, then the airplane will have traveled such distance in that hour.

If, during a unit of time, the needle of the indicator shows a certain distance, this will represent the actual speed of travel during that unit of time.

In traveling in any direction other than either directly east or west, the element of time must be taken into account in ascertaining the speed or the total distance traveled.

The inner casing, the position of which is automatically controlled or stabilized in the manner previously indicated by the azimuth-motor, constitutes a compass, not requiring calibration or correction when the instrument is not traveling, because its position is controlled or governed and held true to the points of the compass by the tendency of the axis of the neutrally-mounted gyroscope and its associated control-ring to tilt due westward by reason of the earth's rotation, but, of course, known calculated corrections have to be made in this regard when the airplane and the instrument are traveling in directions other than directly east or west.

The initial tilt of the control-ring in respect to the axis of its shaft or stem causes one-half of its circumference to project below the plane of revolution of the top surface of the roller 134, while the axis of the neutrally-mounted gyroscope remains vertical.

In order to keep the inner casing true to the direction in which the force acts to tilt the control-ring, the latter is provided with the two arcuate contacts coacting with the roller to govern the operation of the azimuth-motor which in turn shifts the position of the inner casing as occasion requires.

As a matter of fact, even when working normally with the casing true to the direction of action of such force, the casing will constantly oscillate slightly because the roller will alternately contact with the segments of the control-ring operating the motor momentarily alternately in opposite directions.

Stated otherwise, since the roller only contacts with one-half of the whole circumference of the control-ring, and its insulation section thereof is slightly less than 180 degrees, the roller during such half of its revolution will at first contact with the end portion of one of such segments thereby actuating the azimuth-motor in a direction to turn the inner casing and the control-ring to carry such segment away from the roller thus breaking the circuit of and stopping the motor as soon as the roller passes on to the insulation part of the ring, the entire length of which it traverses and then momentarily touches the opposite end of the other conductive segment of the ring, thus causing a short rotation of the motor in the opposite direction to swing the casing and the ring in a direction to break such contact even though the roller continues its revolution in the same direction as previously.

The result is that the contact portions of the ring are upwardly out of contact with the horizontally revolving roller.

The inner casing by reason of this action is constantly oscillating intermittently on each side of the true direction of action of the force or forces tending to tilt the ring.

This will permit the ascertainment of the true meridian when all factors involved are taken into account.

Such oscillation of the inner casing as described forms a simple or convenient means to determine whether or not the axis of the precessional gyroscope 21 is at right angles to the vertical, or the direction of the action of gravity on such gyroscope. If such axis falls below the horizontal, the plane of precession of the roller 134 will be elevated and the lengths of such casing oscillations will be augmented by reason of the roller contacting with the under face of the control-ring for more than 180 degrees or more than one-half, and on the other hand, if the axis of gyroscope 21 is inclined upwardly from its central support, the roller will be lowered and contact with less than 180 degrees of the control-ring will occur, causing the oscillations of the inner casing to be less in extent than normal.

The magnitude or length of these oscillations of the inner casing may be read by inspecting the movements of the inner casing scale 296 with relation to the zero graduation of the lubber-ring scale 293 or the zero graduation of the outer casing scale 290.

A convenient means is provided in this instrument wherein the element of inertia is employed during a temporary change of speed, either acceleration or retardation, to determine the true direction of travel of the airplane at that instant.

In order to determine whether or not the airplane is drifting sidewise by reason of a cross current of air, the inertia weight pivoted on a vertical axis and revolved constantly in a horizontal plane by the precessing gyroscope 21 has its two contact brushes electrically connected together through the metallic yoke on which they are mounted, and these brushes project upwardly inside of the control-ring and are adapted to be brought into use only when drift is to be ascertained, normally acting idly with their electric connections broken.

If the airplane is suddenly accelerated and continued in the original direction of travel, and the push-button switch 238 operated, which will break the circuit of the roller with the azimuth-motor and insert such contacts of the inertia yoke in the azimuth-motor circuit, the inertia yoke will swing rearwardly and bring one of the brushes against the inner curved edge of the insulation section of the control-ring, and as the yoke continues its revolution such brush will be brought into contact with the end portion of one of the contact segments of the ring and the azimuth-motor will operate to oscillate the inner casing as it did when associated with the roller, provided there is no drift, the companion brush of the yoke cooperating with the other segment of the ring after the pivot of the yoke has passed the frontmost part of the ring, the two brushes unitedly performing the same function that the roller did in the other instance.

If, however, drift exists, the airplane moves at an angle to its longitudinal axis and the brushes of the inertia yoke will have a greater period or length of contact with one segment of the ring than with the other, causing the inner casing to swing to a greater extent to one side of the lubber-line than to the other side, which action may be seen by inspecting the inner casing scale.

However, as this instrument indicates the true direction traveled, even though the drift is taking place, it can be compared with a magnetic compass to ascertain the extent of drift.

When the amount of drift has been determined, the lubber-line ring 292 carried by the outer casing may be angularly adjusted in relation to the scale on the outer casing to compensate for such drift.

Those skilled in this art will understand that this invention is not limited and restricted to the precise and exact details of construction specified because these may be modified within comparatively wide limits without departure from the heart and essence of the invention and without the sacrifice of any of its substantial benefits and advantages.

I claim:

1. In a gyroscopic appliance of the character described, the combination of a support, a mounting revoluble around said support, gyroscopic means on said mounting subject to the action of gravity and adapted to cause precession of itself and the mounting around said support, an inertia counterbalancing weight on said mounting on the side thereof opposite said gyroscopic means, and means to balance the action of gravity on said weight.

2. In a gyroscopic appliance of the character described, the combination of a support, a mounting adapted to revolve about said support and to rock vertically, gyroscopic means to cause a precessional rotation of itself and said mounting about said support, a weight having a yielding connection with said mounting counterbalancing the inertia of the weight of said gyroscopic means causing said precession, and means to balance the action of gravity on said counterbalancing weight.

3. In a gyroscopic appliance of the character described, the combination of a support, a mounting adapted to revolve about said support and to rock vertically, gyroscopic means to cause a precessional rotation of itself and said mounting about said support, a weight having a yielding connection with said mounting counterbalancing the inertia of the weight of said gyroscopic means causing said precession, and means including an exceedingly flexible spring to balance the action of gravity on said weight, whereby slight changes in the position of the latter do not materially affect the action of said spring.

4. In a gyroscopic appliance of the character described, the combination of a support, a mounting adapted to revolve about said support and to rock vertically, gyroscopic means to cause a precessional rotation of itself and said mounting about said support, a weight having a yielding cushion connection with said mounting counterbalancing the inertia of the weight of said gyroscopic means causing said precession, and means to balance the action of gravity on said weight.

5. In a gyroscopic appliance of the character described, the combination of an upright post, a bracket member rotatable on said post, a substantially horizontal ring having trunnion bearings rockingly mounted in ears of said bracket member and having a substantially horizontal radial axle disposed at right angles to said trunnion bearings, gyroscopic means on and with its rotor revoluble about said axle, a substantially horizontal yoke rockingly mounted on said trunnion bearings and extending from the ring diametrically opposite said axle, a weight on said yoke counterbalancing the inertia of the weight of said gyroscopic means causing the precession of the latter, the ring, and the bracket member about said post, and a yielding vertical connection between said yoke and ring.

6. In a gyroscopic appliance of the character described, the combination of an upright post, a bracket member rotatable on said post, a substantially horizontal ring having trunnion bearings rockingly mounted in ears of said bracket member and having a substantially horizontal radial axle disposed at right angles to said trunnion bearings, gyroscopic means on and with its rotor revoluble about said axle, a substantially horizontal yoke rockingly mounted on said trunnion bearings and extending from the ring diametrically opposite said axle, a weight on said yoke counterbalancing the inertia of the weight of said gyroscopic means causing said gyroscopic means, ring, and bracket member to precess about said post, a yielding vertical connection between said yoke and ring, and means on said bracket member to balance the action of gravity on said inertia counterbalancing weight.

7. In a gyroscopic appliance of the character described, the combination of an upright post, a bracket member rotatable on said post, a substantially horizontal ring having trunnion bearings rockingly mounted in ears of said member and having a substantially horizontal radial axle disposed at right angles to said trunnion bearings, gyroscopic means on and with its rotor revoluble about said axle, a substantially horizontal yoke rockingly mounted on said trunnion bearings and extending from the ring diametrically opposite said axle, a weight on said yoke counterbalancing the inertia of the weight of said gyroscopic means causing the precession of such gyroscopic means, ring, and bracket member around said post, a yielding vertical cushioned connection between said yoke and ring, means on said bracket member to balance the action of gravity on said inertia counterbalancing weight, and means to limit the upward and downward rocking movement of said ring.

8. In a gyroscopic appliance of the character described, the combination of an upright post, a member rotatable on said post, a mounting rockingly supported on said member and having a substantially horizontal axle disposed at an angle to its turning axis on said member, gyroscopic means on and with its rotor revoluble about said axle, said gyroscopic means causing the precession of itself, the mounting, and the member around said post, a substantially horizontal yoke rockingly mounted on said member coaxially with said mounting and disposed directly opposite said yoke, a weight on said yoke counterbalancing the inertia of the weight of said gyroscopic means causing said precession, a yielding vertical connection between said yoke and said mounting, and means on said member to balance the action of gravity on said inertia counterbalancing weight.

9. In a gyroscopic appliance of the character described, the combination of a support, an upright axle, a universal knife-edge bearing for said axle on said support giving to the former freedom for tilting movement in any direction, a symmetrical gyroscope mounted on said axle with its center of mass coincident with the center of said universal bearing, whereby the gyroscope is neutralized as to gravity and inertia with respect to its support, and means to relieve said bearing from horizontal strains.

10. In a gyroscopic appliance of the character described, a lower upright shaft, a socket-bearing for the bottom end of said shaft, releasable means to hold said shaft normally against rotation, an upper axle normally nonrotatably mounted on said lower shaft with freedom for tilting movement, and a gyroscope mounted on said upper axle.

11. In a gyroscopic appliance of the character described, the combination of an upright support, a mounting adapted to rotate about said support and to rock vertically, gyroscopic means on said mounting subject to the action of gravity and designed to effect horizontal precessional rotation of itself and said mounting around said support, a second gyroscope, and means operated by said second gyroscope to maintain said mounting substantially horizontal during its precessional movement.

12. In a gyroscopic appliance of the character described, the combination of an upright support, a mounting adapted to rotate about said support and to rock vertically, gyroscopic means on said mounting subject to the action of gravity and designed to effect horizontal precessional rotation of itself and said mounting around said support, a second gyroscope, and means operated by said second gyroscope to substantially neutralize the precessional friction of said first gyroscope.

13. In a gyroscopic appliance of the character described, the combination of an upright support, a mounting adapted to rotate about said support and to rock vertically, gyroscopic means on said mounting subject to the action of gravity and designed to effect horizontal precessional rotation of itself and said mounting around said support, a second gyroscope, and an air-blast means operated by said second gyroscope to substantially neutralize the precessional friction of said first gyroscope.

14. In a gyroscopic appliance of the character described, the combination of an upright support, a mounting adapted to rotate about said support and to rock vertically, gyroscopic means on said mounting subject to the action of gravity and designed to effect horizontal precessional rotation of itself and said mounting around said support, tapered vane means rotatable with said mounting, a second gyroscope, and air-blast means operated by said second gyroscope and coacting with said vanes to substantially neutralize the precessional friction of said first gyroscope.

15. In a gyroscopic appliance of the character described, the combination of a support, a mounting rotatable about said support and adapted to rock vertically, gyroscopic means carried by said mounting subject to the action of gravity and designed to effect horizontal precessional rotation of itself and said mounting around said support, a weight yieldingly supported on said mounting and adapted to counterbalance the inertia of the weight of said gyroscopic means producing its precession, and means to dampen vertical movement of said inertia counterbalancing weight.

16. In a gyroscopic appliance of the character described, the combination of a support, a mounting rotatable about said support and adapted to rock vertically, gyroscopic means carried by said mounting subject to the action of gravity and designed to effect horizontal precessional rotation of itself and said mounting around said support, a weight yieldingly supported on said mounting and adapted to counterbalance the inertia of the weight of said gyroscopic means producing its precession, a second gyroscope, and means operated by said second gyroscope to dampen vertical movements of said inertia counterbalancing weight.

17. In a gyroscopic appliance of the character described, the combination of a support, a mounting rotatable about said support and adapted to rock vertically, gyroscopic means carried by said mounting subject to the action of gravity and designed to effect horizontal precessional rotation of itself and said mounting around said support, a weight yieldingly supported on said mounting and adapted to counterbalance the inertia of the weight of said gyroscopic means producing such precession, a second gyroscope, and air-blast means operated by said second gyroscope to dampen vertical movements of said inertia counterbalancing weight.

18. In a gyroscopic appliance of the character described, the combination of a support, a gyroscope, means to neutralize said gyroscope as to both gravity and inertia effect upon the precession caused by the weight of said gyroscope, a second gyroscope mounted for precession, and means to employ the precessional movement of said second gyroscope tending to maintain the axis of said first gyroscope intermittently in a substantially definite relation to the center of the earth.

19. In a gyroscopic appliance of the character described, the combination of a support, a mounting revoluble with reference to said support and adapted to rock vertically, a gyroscope free to tilt its plane of rotation independently of said mounting, gyroscopic means on said mounting adapted to cause precession of itself and said mounting about said support, means operated by the precession of said second gyroscope tending to maintain the axis of said first gyroscope in a substantially definite relation to the center of the earth, and means to substantially neutralize the precessional friction of said second gyroscope, whereby it will precess in a definite horizontal plane.

20. In a gyroscopic appliance of the character described, the combination of a support, a neutrally-mounted gyroscope thereon free to tilt its plane of rotation, a mounting revoluble with reference to said support and adapted to rock vertically, gyroscopic means on said mounting adapted to cause precession of itself and said mounting about said support, means operated by the precession of said second gyroscope tending to maintain the axis of said first gyroscope in a substantially definite relation to the center of the earth, and means actuated by said neutrally-mounted gyroscope to substantially neutralize the precessional friction of said second gyroscope, whereby it will precess in a definite horizontal plane.

21. In a gyroscopic appliance of the character described, the combination of a support, an upright axle having a universal bearing on said support whereby the axle may tilt in any direction, a neutral gyroscope mounted on said axle with its center of mass coincident with the center of said bearing, a mounting revoluble about said support and adapted to tilt, gyroscopic means on said mounting subject to the action of gravity to cause precession of itself and said mounting around said support, means to counterbalance the inertia of the weight of said gyroscopic means relative to said support, means actuated by the precession of said gyroscopic means tending to maintain the axis of said neutrally-mounted gyroscope vertical, and means to indicate the amount of force exerted to tend to maintain said axis vertical.

22. In a gyroscopic appliance of the character described, the combination of an upright axle, a universal bearing for said axle permitting tilting thereof, a gyroscope mounted on said axle, a control-member slidable lengthwise of said axle, means yieldingly resisting the sliding of said member relative to said axle, a second gyroscope mounted for horizontal precession about said axle and means employing such precessional movement acting on said member tending to right the axle to vertical position.

23. In a gyroscopic appliance of the character described, the combination of an upright tiltable axle, a gyroscope mounted thereon, a control-member having a portion slidable lengthwise of said axle, means yieldingly resisting said sliding action, a support, a mounting rotatable around said support and adapted to tilt, gyroscopic means on said mounting causing precession of itself and said mounting around said support, and a roller on said mounting beneath said control-member and adapted to slide the same during the precession with the mounting of said roller.

24. In a gyroscopic appliance of the character described, the combination of a support, an upright axle, a universal bearing supporting said axle on said support, whereby the axle may tilt in any direction, a gyroscope mounted on said axle with its center of mass coincident with the center of said bearing, a mounting adapted to rock vertically and to rotate around said support, gyroscopic means on said mounting causing horizontal precession of itself and said mounting around said support, a control-member having a sliding connection with said axle, means yieldingly resisting such sliding action, and means on said mounting adapted to slide said member during precession of said mounting.

25. In a gyroscopic appliance of the character described, the combination of a support, an upright axle, a universal bearing supporting said axle on said support, whereby the axle may tilt in any direction, a gyroscope mounted on said axle with its center of mass coincident with the center of said bearing, a mounting adapted to rock vertically around the center of said bearing and to rotate around said support around the center of said bearing, gyroscopic means on said mounting subject to the action of gravity causing horizontal precession of itself and said mounting around said support, a control-member having a bottom face and a sliding connection with said axle, means yieldingly resisting such sliding action, and means on said mounting with a top face in line with the axis of said precessional gyroscopic means adapted to engage the bottom face of and to slide said member during precession of said mounting.

26. In a gyroscopic appliance of the character described, the combination of a support, an upright axle, a universal bearing supporting said axle on said support, whereby the axle may tilt in any direction, a gyroscope mounted on said axle with its center of mass coincident with the center of said bearing, a mounting adapted to rock vertically around the center of the bearing and to rotate about said support around the center of said bearing, gyroscopic means on said mounting subject to the action of gravity causing horizontal precession of itself and said mounting around said support, means counterbalancing the inertia of the weight of said gyroscopic means causing such precession, a control member having a bottom face and a sliding connection with said axle, means yieldingly resisting such sliding action, and means on said mounting with its top face in line with the axis of said precessional gyroscopic means adapted to engage the bottom face of and to slide said member during precession of said mounting.

27. In a gyroscopic appliance of the character described, the combination of an axle, a support, a universal bearing supporting said axle on said support permitting tilting of the axle in any direction, a gyroscope on said axle having its center of mass coincident with the center of said bearing, a mounting revoluble around and vertically rockable about the center of said bearing, gyroscopic means on and causing horizontal precession of said mounting, means to maintain said mounting substantially horizontal during such precession, a control-member slidable relatively to said axle and having a ring portion around the center of said bearing, means resisting such sliding action, and a roller on said mounting with a top face in register with the axis of said gyroscopic means and cooperating with the control-ring to tend to right said axle during precession of the roller.

28. In a gyroscopic appliance of the character described, the combination of an axle, a support, a universal bearing supporting said axle on said support permitting tilting of the axle in any direction, a gyroscope on said axle having its center of mass coincident with the center of said bearing, a mounting revoluble around and vertically rockable about the center of said bearing, gyroscopic means on and causing horizontal precession of said mounting, means operated by said first gyroscope to maintain said mounting substantially horizontal during such precession, means to counterbalance the inertia of the weight of said gyroscopic means causing such precession, a control-member slidable relatively to said axle and having a ring portion around the center of said bearing, means resisting such sliding action, means to indicate the force exerted to slide such member, and a roller on said mounting with a top face in register with the axis of said gyroscopic means cooperating with the control-ring to tend to right said axle during precession of the roller.

29. In a gyroscopic instrument of the character described, the combination of a tiltably mounted upright axle, a gyroscope mounted thereon, a control-member having a main body and a stem at an oblique angle to the plane of said main body and slidable in said axle, means yieldingly resisting said sliding action, and gyroscopic means revoluble always in a substantially-horizontal plane and adapted to slide said control-member by contact with the relatively-inclined main body thereby tending to right the axle if tilted.

30. In a gyroscopic instrument of the character described, the combination of a tiltably-mounted upright axle, a gyroscope mounted thereon with its center of mass coincident with the center of the axle mounting, a control-member having a main body and a stem at an oblique angle to the plane of said main body and slidable in said axle, means yieldingly resisting said sliding action, gyroscopic means subject to the action of the gravity precessing always in a substantially-horizontal plane and adapted to slide said control-member by contact with its relatively inclined main body, and means to neutralize inertia effect upon the precession caused by the weight of said gyroscopic means.

31. In a gyroscopic instrument of the character described, the combination of a non-rotating tiltably-mounted axle, a gyroscope mounted thereon, a control-member with electric contacts thereon slidably mounted on said axle, means yieldingly resisting said sliding action, gyroscopic means precessing always in a substantially-horizontal plane adapted to slide said relatively stationary control-member, cooperating electric contact means on said revolving means, and an electric appliance the circuit of which is governed by said coacting electric contacts.

32. In an instrument of the character described, the combination of an electric-motor, a member the position of which is controlled by said motor, a movable element the position of which is subject to its own inertia, gyroscopic means subject to the action of gravity and mounted for horizontal precession, means to rotate said element by the precession of said gyroscope means, a weight counterbalancing the inertia of the weight of said gyroscopic means causing such precession, and electric contact means in the circuit of said motor governed by the conjoint action of said member and inertia element, to control the position of said member.

33. In an instrument of the character described, the combination of a reversible electric-motor, a member having electric contact and insulation sections, means connecting said motor and member whereby the former controls the position of the latter, a movable element the position of which is subject to its own inertia, and electric contact means actuated by said element adapted to cooperate with the sections of said member, the electric contacts of said member and element governing the electric circuit and operation of said motor, whereby the position of said member is under the control of said inertia element permitting determination of the direction of travel of the instrument.

34. In an instrument of the character described, the combination of a reversible electric-motor, a member having a ring composed of an insulation section of approximately 180 degrees and two symmetrical electric contacts of about 90 degrees each insulated from one another, means connecting said motor and member whereby the former controls the position of the latter, a movable element the position of which is subject to its own inertia, and electric contact means actuated by said element adapted to cooperate with the insulation and contact portions of said ring, the electric contacts of said member and element being in the electric circuit and governing the operation of said motor, whereby the position of said member is under the control of said inertia element, permitting determination of the direction of travel of the instrument.

35. In an instrument of the character described, the combination of a reversible electric-motor, a member having a ring composed of an insulation section of approximately 180 degrees and two symmetrical electric contact sections each of about 90 degrees insulated from one another, means connecting said motor and member whereby the former controls the position of the latter, means to indicate the position of said member, a pivoted element with two electric contacts located substantially 180 degrees apart on the diameter of said ring, the position of said element being subject to its own inertia, means to rotate said element and its pivot about the axis of said ring, the electric contact means of said ring and element being adapted to cooperate with one another, being in the electric circuit of and governing the operation of said motor, whereby the position of said member is under the control of said inertia element, permitting determination of the direction of travel of the instrument.

36. In an instrument of the character described, the combination of a reversible electric-motor, a member having a ring composed of an insulation section of approximately 180 degrees and two symmetrical electric contact sections each of about 90 degrees insulated from one another, means connecting said motor and member whereby the former controls the position of the latter, an element mounted on a vertical pivot for horizontal oscillation the position of which is subject to its own inertia, electric contacts on said element approximately 180 degrees apart on a diameter of said ring, and gyroscopic means having horizontal precession, the element and its pivot being rotated about the axis of said ring by such horizontal precession, the electric contacts of said member and element cooperating with one another and being in the electric circuit of and governing the operation of said motor, whereby the position of said member is under the control of said inertia element, permitting determination of the direction of travel of the instrument.

37. In an instrument of the character described, the combination of a reversible electric-motor, a member having a ring composed of an insulation section of approximately 180 degrees and two symmetrical electric contact sections each of about 90 degrees insulated from one another, means connecting said motor and member whereby the former controls the position of the latter, means to indicate the position of said member, an inertia element mounted on a vertical pivot for horizontal oscillation, electric contacts on said element approximately 180 degrees apart on a diameter of said ring, gyroscopic means subject to the action of gravity and having a substantially horizontal precession, a weight counterbalancing the inertia of the weight of said gyroscopic means causing such precession, and means to rotate said element and its pivot by such precession around the axis of said ring, the electric contacts of said member and element cooperating with one another and being in the electric circuit of and governing the operation of said motor, whereby the position of said member is under the control of said inertia element, permitting determination of the direction of travel of the instrument as displayed by said indicating means.

38. In a gyroscopic instrument of the character described, the combination of a member, a neutrally-mounted tiltable gyroscope, electric means to change the position of said member, means controlled by the position of said gyroscope governing the circuit of said electric means and hence controlling the position of said member, an element the position of which is subject to its own inertia, and means whereby said element governs the circuit of said electric means and hence is adapted to control the position of said member.

39. In an appliance of the character described, the combination of a support, a gimbal-ring rockingly mounted on said support, an instrument rockingly mounted in said gimbal-ring at a right-angle to the mounting of the gimbal-ring on the support, an electric-motor, means whereby the actuation of said motor rocks said gimbal-ring on said support, a second electric-motor, means whereby the actuation of said second motor rocks said instrument in said gimbal-ring, electric contacts on said instrument in the circuit of and controlling the operation of said first motor, and electric contacts on said instrument at a right angle to said first electric contacts and in the circuit of and controlling the operation of said second motor, whereby stabilizing of the instrument is automatically effected.

40. In an appliance of the character described, the combination of an instrument casing, a universal mounting for said casing, electric-motor means to rock said casing in one direction, a second electric-motor means to rock said casing in a direction at right-angles to said first direction, an upright tiltable axle, a symmetrical gyroscope on said axle, gyroscopic means tending to maintain said axle vertical, electric contact means in the circuit of and controlling the operation of said first electric-motor means including a contact the position of which is determined by the position of said axle, and second electric contact means at substantially right angles to said first electric contact means in the circuit of and controlling the operation of said second electric-motor means and including a contact the position of which is determined by the position of said axle.

41. In an appliance of the character described, the combination of an instrument support, a universal mounting for said support, stabilizing means to rock said support in one direction on said mounting, a second stabilizing means to rock said support on said mounting at right angles to said first direction, means controlling said first stabilizing means, means controlling said second stabilizing means at substantially right-angles to said first controlling means, a supplementary support on said first support, a mounting revoluble and vertically rockable on said supplementary support, gyroscopic means on said mounting and causing horizontal precession of itself and said mounting on said supplementary support, means to overcome the precessional friction of said gyroscopic means, and means controlled by the precession of said gyroscopic means governing the operation of each of said stabilizing controlling means.

42. In an appliance of the character described, the combination of a support, a gimbal-ring rockingly mounted on said support, an instrument rockingly mounted in said gimbal-ring on said support, a first reversible electric-motor, means permitting said motor to rock said gimbal-ring on said support, a second reversible electric-motor, means enabling said second motor to rock said instrument in said gimbal-ring, an upright tiltable axle in said instrument, a gyroscope on said axle, means tending to maintain said axle vertical, a stabilized electric contact the position of which is governed by said axle, a pair of cooperating electric contacts carried by another part of the instrument, said three contacts being in the circuit of and controlling the operation of said first motor, a second stabilized electric contact the position of which is governed by said axle, a second pair of electric-contacts at substantially right angles to said first pair cooperating with said second stabilized contact, said three second contacts being in the circuit of and controlling the operation of said second motor.

43. In an appliance of the character described, the combination of a support, a gimbal-ring rockingly mounted on said support, an instrument rockingly mounted in said gimbal-ring at a right angle to the mounting of the gimbal-ring on the support, an electric-motor, means permitting said motor to rock said gimbal-ring on said support, a second electric-motor, means permitting said second electric-motor to rock said instrument in said gimbal-ring, electric contact means in the circuit of and controlling the operation of said first electric-motor, second electric contact means in the circuit of and controlling the operation of said second electric-motor, and gyroscopic means in said instrument stabilizing a contact element of each of said electric contact means.

44. In an appliance of the character described, the combination of an instrument support, a universal mounting for said support, stabilizing means to rock said support in one direction, a second stabilizing means to rock said support at right angles to said direction, a standard on said support, a mounting revoluble around said standard and capable of tilting vertically, gyroscopic means on said mounting causing precession of itself and said mounting around said standard, means to overcome the precessional friction of said gyroscope, a weight counterbalancing the inertia of the weight of said gyroscopic means causing said precession, means counterbalancing the weight of said inertia counterbalancing weight, and means controlled at least in part by the precession of said gyroscopic means governing the operation of said two stabilizing means.

45. In an appliance of the character described, the combination of an instrument support, a universal mounting for said support, stabilizing means to rock said support in one direction, a second stabilizing means to rock said support in a direction at right angles to said first direction, a standard on said support, an upright axle mounted for tilting movement on said standard, a gyroscope neutrally mounted on said axle, a mounting revoluble on said standard and free to pivot about a horizontal axis, gyroscopic means on said mounting subject to the action of gravity causing precession of itself and said mounting around said standard, means to neutralize the precessional friction of said gyroscopic means, means to neutralize the effects of inertia of said gyroscopic means on its precessional movement, means operated by the precession of said gyroscopic means tending to maintain said axle vertical, and two means at right angles to one another governing respectively the operations of said support stabilizing means, each of said two means having parts the positions of which are controlled by said support and by said axle.

IRA A. WEAVER.